United States Patent

Sheppard et al.

[11] Patent Number: 5,159,055
[45] Date of Patent: Oct. 27, 1992

[54] COREACTIVE OLIGOMER BLENDS

[75] Inventors: Clyde H. Sheppard, Bellevue, Wash.; Hyman R. Lubowitz, Rolling Hills Estates, Calif.

[73] Assignee: The Boeing Company, Seattle, Wash.

[21] Appl. No.: 849,110

[22] Filed: Mar. 3, 1992

Related U.S. Application Data

[60] Division of Ser. No. 174,747, Mar. 29, 1988, Pat. No. 5,115,087, which is a continuation-in-part of Ser. No. 785,364, Oct. 7, 1985, Pat. No. 4,871,475, said Ser. No. 174,747, is a continuation-in-part of Ser. No. 134,335, Dec. 17, 1987, which is a continuation-in-part of Ser. No. 816,489, Jan. 6, 1985, Pat. No. 4,739,030, which is a continuation-in-part of Ser. No. 704,475, Feb. 22, 1985, abandoned, which is a division of Ser. No. 505,348, Jun. 17, 1983, Pat. No. 4,536,559, said Ser. No. 174,747, is a continuation-in-part of Ser. No. 46,376, May 14, 1987, which is a continuation-in-part of Ser. No. 715,801, Mar. 22, 1985, abandoned, which is a continuation-in-part of Ser. No. 536,264, Sep. 27, 1983, abandoned, said Ser. No. 46,376, is a continuation-in-part of Ser. No. 810,818, Dec. 17, 1985, abandoned, which is a continuation-in-part of Ser. No. 536,350, Sep. 27, 1983, abandoned, which is a continuation-in-part of Ser. No. 519,394, Aug. 3, 1983, abandoned, said Ser. No. 174,747, is a continuation-in-part of Ser. No. 116,592, Nov. 3, 1987, which is a continuation-in-part of Ser. No. 816,490, Jan. 6, 1986, abandoned, which is a continuation-in-part of Ser. No. 651,862, Sep. 19, 1984, abandoned, said Ser. No. 174,747, is a continuation-in-part of Ser. No. 137,493, Dec. 23, 1987, which is a continuation-in-part of Ser. No. 726,259, Apr. 23, 1985, abandoned, said Ser. No. 174,747, is a continuation-in-part of Ser. No. 61,938, Jun. 12, 1987, which is a division of Ser. No. 865,228, May 20, 1986, abandoned, which is a continuation-in-part of Ser. No. 781,847, Sep. 20, 1985, said Ser. No. 174,747, is a continuation-in-part of Ser. No. 16,703, Feb. 20, 1987, said Ser. No. 174,747, is a continuation-in-part of Ser. No. 181,013, May 13, 1988, which is a continuation-in-part of Ser. No. 92,740, Sep. 3, 1987, abandoned.

[51] Int. Cl.⁵ .............................................. C08G 73/12
[52] U.S. Cl. .................................. 528/322; 528/125; 528/128; 528/170; 528/171; 528/172; 528/173; 528/220; 528/229; 528/321
[58] Field of Search .............. 528/322, 125, 128, 170, 528/171, 172, 173, 220, 229, 321

[56] References Cited

U.S. PATENT DOCUMENTS

| | | | |
|---|---|---|---|
| 3,658,764 | 4/1972 | Bargain et al. | 260/78 UA |
| 3,925,324 | 12/1975 | Gerard | 260/78 UA |
| 4,299,946 | 11/1981 | Balme et al. | 528/128 |
| 4,526,838 | 7/1985 | Fujioke et al. | 428/458 |
| 4,600,769 | 7/1986 | Kumar et al. | 528/322 |
| 4,680,377 | 7/1987 | Matsumura et al. | 528/322 |
| 4,730,030 | 3/1988 | Hahn et al. | 526/262 |

Primary Examiner—Morton Foelak
Attorney, Agent, or Firm—Senniger, Powers, Leavitt & Roedel

[57] ABSTRACT

The physical properties of high performance composites can be tailored by using coreactive oligomer blends to make the composites. The blends include a first oligomer having an unsaturated hydrocarbon end cap and a second oligomer having an amine, hydroxyl, sulfhydryl, or

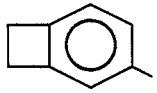

functionality. Upon curing, the oligomers homopolymerize (i.e. addition polymerize) and mutually interlink (i.e. copolymerize) to form composites possessing intermediate properties to those exhibited by the pure oligomers. The coreactive oligomer blends may also include noncrosslinking polymers and other coreactants, as desired. Stiffness or toughness can be increased in thermally stable composites without significant loss of other properties through these coreactive oligomer blends that cure to block copolymers.

8 Claims, No Drawings

COREACTIVE OLIGOMER BLENDS

REFERENCE TO RELATED APPLICATIONS

The present application is a divisional application based upon U.S. Ser. No. 07/174,747, filed Mar. 29, 1988, now U.S. Pat. No. 5,115,037, which is a continuation-in-part application based upon U.S. Ser. No. 06/785,364, filed Oct. 7, 1985, now U.S. Pat. No. 4,871,475.

The parent application is a continuation-in-part application based upon U.S. Ser. No. 07/134,335, filed Dec. 17, 1987, which was a continuation-in-part application based upon U.S. Ser. No. 816,489, filed Jan. 6, 1985, now U.S. Pat. No. 4,739,030, which was a continuation-in-part application based upon Ser. No. 704,475, filed Feb. 22, 1985, now abandoned, which was a divisional application based upon U.S. Ser. No. 505,348, filed Jun. 17, 1983, now U.S. Pat. No. 4,536,559.

The parent application is also a continuation-in-part application of U.S. Ser. No. 07/046,376, filed May 4, 1987, which was a continuation-in-part application based upon U.S. Ser. No. 715,801, filed Mar. 22, 1985, now abandoned, which was a continuation-in-part application based on U.S. Ser. No. 536,264, filed Sep. 27, 1983, now abandoned.

U.S. Ser. No. 07/046,376 now related as a continuation-in-part application to U.S. Ser. No. 810,818, filed Dec. 17, 1985, now abandoned, which was a continuation-in-part application based upon U.S. Ser. No. 536,350, filed Sep. 27, 1983, now abandoned, which was a continuation-in-part application based upon U.S. Ser. No. 519,394, filed Aug. 3, 1983, now abandoned. Accordingly, the parent application is a continuation-in-part application based upon these earlier applications.

The parent application is also a continuation-in-part application based upon U.S. Ser. No. 07/116,592 filed Nov. 3, 1987, which was a continuation-in-part application based upon U.S. Ser. No. 816,490, filed Jan. 6, 1986, now abandoned, which was a continuation-in-part application based upon U.S. Ser. No. 651,862, filed Sep. 19, 1984, now abandoned.

The parent application is also a continuation-in-part application based upon U.S. Ser. No. 07/137,493, filed Dec. 23, 1987, which is a continuation-in-part application based upon U.S. Ser. No. 726,259, filed Apr. 23, 1985, now abandoned.

The parent application is also a continuation-in-part application based upon U.S. Ser. No. 07/061,938, filed Jun. 12, 1987, which was a divisional application based upon U.S. Ser. No. 865,228, filed May 20, 1986, now abandoned, which was a continuation-in-part application based upon U.S. Ser. No. 781,847, filed Sep. 20, 1985.

The parent application is also a continuation-in-part application based upon U.S. Ser. No. 07/016,703, filed Feb. 20, 1987.

The parent application, finally, is a continuation-in-part application based upon U.S. Ser. No. 07/181,013, filed May 13, 1988, which was a continuation-in-part application based upon U.S. Ser. No. 092,740, filed Sep. 3, 1987, now abandoned.

TECHNICAL FIELD

The present invention relates to coreactive oligomer blends and block copolymers comprising two or more interlinking oligomers, and, more particularly, to oligomer blends, prepregs, and composites that include coreactive oligomers wherein at least one oligomer has two crosslinking sites at each end of the backbone.

BACKGROUND OF THE INVENTION

Recently, chemists have sought to synthesize oligomers for high performance advanced composites suitable for aerospace applications. These composites should exhibit solvent resistance; be tough, impact resistant, and strong; be easy to process; and be thermoplastic. Oligomers and composites that have thermo-oxidative stability, and, accordingly can be used at elevated temperatures, are particularly desirable.

While epoxy-based composites are suitable for many applications, their brittle nature and susceptibility to thermal or hydrolytic degradation make them inadequate for many aerospace applications, especially those applications which require thermally stable, tough composites. Accordingly, research has recently focused on polyimide composites to achieve an acceptable balance between thermal stability, solvent resistance, and toughness. Still the maximum temperatures for use of the polyimide composites, such as PMR-15, are about 600°–625° F., since they have glass transition temperatures of about 690° F. PMR-15, however, suffers from brittleness.

There has been a progression of polyimide sulfone compounds synthesized to provide unique properties or combinations of properties. For example, Kwiatkowski and Brode synthesized maleic-capped linear polyarylimides as disclosed in U.S. Pat. No. 3,839,287. Holub and Evans synthesized maleic- or nadic-capped, imido-substituted polyester composition as disclosed in U.S. Pat. No. 3,729,446. We synthesized thermally stable polysulfone oligomers as disclosed in U.S. Pat. No. 4,476,184 or U.S. Pat. No. 4,536,559, and have continued to make advances with polyetherimidesulfones, polybenzoxazolesulfones, polybutadienesulfones, and "star" or "star-burst" multidimensional oligomers. We have shown surprisingly high glass transition temperatures yet reasonable processing and desirable physical properties in many of these oligomers and their composites.

Polybenzoxazoles, such as those disclosed in our copending applications U.S. Ser. No. 116,592 (to Lubowitz & Sheppard) and U.S. Ser. No. 121,964 (to Lubowitz, Sheppard, and Stephenson), may be used at temperatures up to about 750°–775° F., since these composites have glass transition temperatures of about 840° F. Some aerospace applications need composites which have even higher use temperatures while maintaining toughness, solvent resistance, ease of processing, formability, strength, and impact resistance.

Multidimensional oligomers, such as disclosed in our copending applications U.S. Ser. Nos. 810,817 and 000,605, are easier to process than some advanced composite oligomers since they can be handled at lower temperatures. Upon curing, however, the oligomers crosslink (homopolymerize) through their end caps so that the thermal resistance of the resulting composite is markedly increased with only a minor loss of stiffness, matrix stress transfer (impact resistance), toughness, elasticity, and other mechanical properties. Glass transition temperatures above 950° F. are achievable.

Commercial polyesters, when combined with well-known diluents, such as styrene, do not exhibit satisfactory thermal and oxidative resistance to be useful for aircraft or aerospace applications. Polyarylesters are often unsatisfactory, also, since the resins often are semicrystalline which may makes them insoluble in laminating solvents, intractable in fusion, and subject to shrinking or warping during composite fabrication. Those polyarylesters that are soluble in conventional laminating solvents remain so in composite form, thereby limiting their usefulness in structural composites. The high concentration of ester groups contributes to resin strength and tenacity, but also makes the resin susceptible to the damaging effects of water absorption. High moisture absorption by commercial polyesters can lead to distortion of the composite when it is loaded at elevated temperature.

High performance, aerospace, polyester advanced composites, however, can be prepared using crosslinkable, end capped polyester imide ether sulfone oligomers that have an acceptable combination of solvent resistance, toughness, impact resistance, strength, processibility, formability, and thermal resistance. By including Schiff base (—CH=N—), imidazole, thiazole, or oxazole linkages in the oligomer chain, the linear, advanced composites formed with polyester oligomers of our copending application U.S. Ser. No. 726,259 can have semiconductive or conductive properties when appropriately doped.

Conductive and semiconductive plastics have been extensively studied (see. e.g., U.S. Pat. Nos. 4,375,427; 4,338,222; 3,966,987; 4,344,869; and 4,344,870), but these polymers do not possess the blend of properties which are essential for aerospace applications. That is, the conductive polymers do not possess the blend of (1) toughness, (2) stiffness, (3) elasticity, (4) ease of processing, (5) impact resistance (and other matrix stress transfer capabilities), (6) retention of properties over a broad range of temperatures, and (7) high temperature resistance that is desirable on aerospace advanced composites. The prior art composites are often too brittle.

Thermally stable multidimensional oligomers having semiconductive or conductive properties when doped with suitable dopants are also known and are described in our copending applications (including U.S. Ser. No. 773,381 to Lubowitz, Sheppard, and Torre). The linear arms of the oligomers contain conductive linkages, such as Schiff base (—N=CH—) linkages, between aromatic groups. Sulfone and ether linkages are interspersed in the arms. Each arm is terminated with a mono- or difunctional end cap (i.e. an end cap having one or two crosslinking functionalities) to allow controlled crosslinking upon heat-induced or chemically-induced curing. Other "semiconductive" oligomers are described in our other copending applications.

Polyamide oligomers and blends are described in our copending applications U.S. Ser. Nos. 046,202; 051,884; and 061,938, and polyetherimide oligomers and blends are described in our copending application U.S. Ser. No. 016,703.

Polyamideimides are generally injection-moldable, amorphous, engineering thermoplastics which absorb water (swell) when subjected to humid environments or immersed in water. Polyamideimides are generally described in the following patents: U.S. Pat. No. 3,658,938; U.S. Pat. Nos. 4,628,079; 4,599,383; 4,574,144; or 3,988,344. The thermal integrity and solvent-resistance can be greatly enhanced by capping amideimide backbones with monomers that present one or two crosslinking functionalities at each end of the oligomer, as described in our copending application U.S. Ser. No. 092,740.

SUMMARY OF THE INVENTION

Block copolymers are promising for tailoring the mechanical properties of composites while retaining ease of processing. The present invention comprises blends of two or more coreactive oligomers. The oligomers are terminated with mutually interreacting caps that allow formation of the block copolymer(s) upon curing. Stiffness can be increased in an otherwise flexible oligomer. Generally at least one of the oligomers in the coreactive oligomer blend will include two crosslinking functionalities at each end of the backbone (i.e. use a difunctional end cap). The resulting composites can be characterized as having alternating segments of a single backbone and double backbones.

The block copolymers formed from the coreactive oligomer blends are generally prepared by blending an oligomer of the general formula:

$$D_i—A—D_i$$

wherein
i = 1 or 2;
A = a hydrocarbon backbone;
D = an unsaturated hydrocarbon residue including a segment selected from the group consisting of:

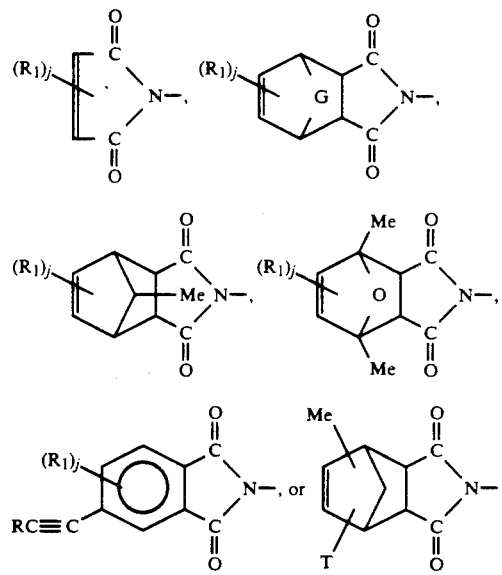

and, preferably,

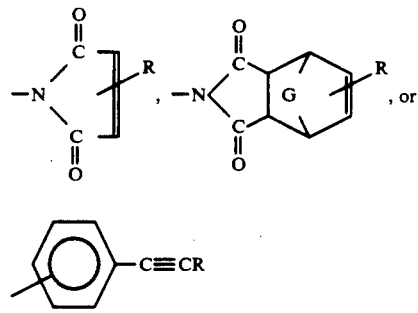

$R_1$ = lower alkyl, aryl, substituted aryl (including hydroxyl or halo-substituents), lower alkoxy, aryloxy, halogen, or mixtures thereof (preferably lower alkyl);
j = 0, 1, or 2;

Me=methyl;
T=allyl or methallyl;
G=—SO$_2$—, —S—, —O—, —CO—, —SO—, —CH$_2$—, —CHR—, or —CR$_2$—; and
R=hydrogen, lower alkyl, or phenyl
with a coreactive oligomer of the general formula:

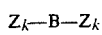

wherein
k=1 or 2;
B=a hydrocarbon backbone that is from the same or a different chemical family as A;
Z=a hydrocarbon residue including a segment selected from the group consisting of:

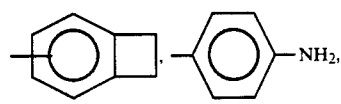

or

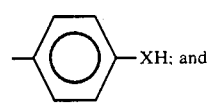

X=—O— or —S—.

Preferably the oligomeric backbones (A or B) are individually selected from the group consisting of:
imidesulfones,
ethersulfones,
amides,
ethers,
esters,
estersulfones,
imides,
etherimides,
amideimides,
oxazoles,
thiazoles,
imidazoles, or
heterocycle (i.e. oxazole, thiazole, or imidazole) sulfones.

Generally, the hydrocarbons are entirely aromatic with phenyl radicals between the linkages.

The coreactive oligomer blends may comprise an equimolar mix of the coreactive oligomers or any other ratio to obtain the desired physical properties achieved through curing that involves mutual (interlinking) polymerization and addition or homo- polymerization. The individual resins should initially have relatively low average formula weights (generally in the range of from about 500–40,000 and usually from about 10,000–20,000) and, accordingly, remain relatively easy to process until the curing reaction when the extended chain and block copolymers are formed to produce the composite.

The coreactive oligomer blends of the present invention can also include noncrosslinking polymers, as desired, to provide the desired properties in the composites. That is, one or more of the oligomers in the coreactive blend may itself be a blend of a crosslinking oligomer and a noncrosslinking compatible polymer, thereby forming a blend with three or more resin components.

BEST MODE CONTEMPLATED FOR MAKING AND USING THE INVENTION

The physical properties of high performance oligomers can be tailored by creating block copolymers through mutually reactive end caps on the respective oligomers. The resulting composites include a mix of homopolymers (i.e., addition polymers) created by crosslinking chain extension and block copolymers formed through a resin interlinking reaction. The coreactive oligomer blends generally include at least one oligomer of the general formula:

wherein
i=1 or 2;
A=a hydrocarbon backbone; and
D=an unsaturated hydrocarbon residue including a segment selected from the group consisting of:

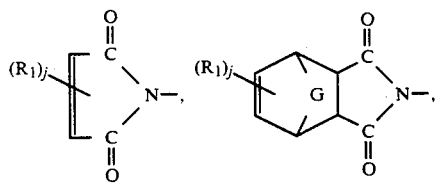

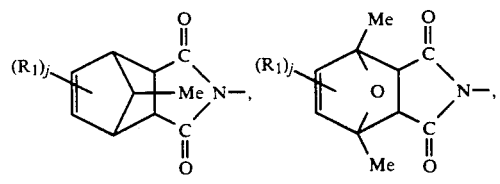

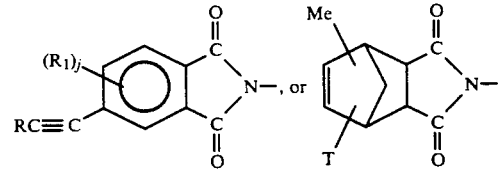

and, preferably,

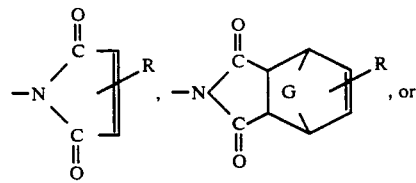

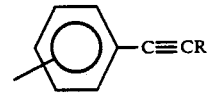

R$_1$=lower alkyl, aryl, substituted aryl (including hydroxyl or halo-substituents), lower alkoxy, aryloxy, halogen, or mixtures thereof (preferably lower alkyl);
j=0, 1, or 2;
Me=methyl;
T=allyl or methallyl;
G=—SO$_2$—, —S—, —O—, —CO—, —SO—, —CH$_2$—, —CHR—, or —CR$_2$— (and, preferably —CH$_2$— or —O—), and
R=hydrogen, lower alkyl, or phenyl and another oligomer of the general formula:

$$Z_k-B-Z_k$$

wherein
k = 1 or 2;
B = a hydrocarbon backbone that is usually different from A; and
Z = a hydrocarbon residue including a segment selected from the group consisting of:

[structure: bicyclic-phenyl-NH₂]

or

[structure: phenyl-XH]; and

X = —O— or —S—.

The backbones (A or B) are generally individually selected from the group consisting of:
imidesulfones;
ethersulfones;
amides;
ethers;
esters;
estersulfones;
imides;
etherimides;
amideimides;
oxazoles;
thiazoles;
imidazoles; or
heterocycle (oxazole, thiazole, or imidazole) sulfones.
and generally include only aromatic (phenyl) radicals between linkages. Although this description will primarily describe para isomers of these backbones, other isomers (particularly meta) can be used. The aromatic radicals in the backbones may include nonreactive substituents in some cases.

Generally, at least one of the oligomers (particularly the $Y_i$—A—$Y_i$ oligomer) will have two crosslinking functionalities (i = 2) at each end of the backbone. Upon curing the interreaction will produce a complex net of interconnected segments rather than simply extended chains. The resulting composite might be envisioned a follows:

[diagram showing interconnected A₁ and B₁ linkages]

wherein
$A_1$ = linkages between the coreactive functionalities;
$B_1$ = linkages by addition polymerization; and
— = a hydrocarbon backbone.

Prior art "coreactive blends" are really simply the use of very high molecular weight polymeric precursors, and produce extended chain polymers.

Oligomers of the general formula $D_i$—A—$D_i$ or $Z_k$—B—$Z_k$ are prepared by reacting suitable end cap monomers with the monomer reactants that are commonly used to form the desired backbones. For example, an imidesulfone is prepared by reacting a sulfone diamine with a dianhydride in accordance with the method described in U.S. Pat. No. 4,584,364. Ethersulfones can be prepared on reacting a suitable dialcohol (i.e. diol, bisphenol, or dihydric phenol) with a dihalogen as described in U.S. Pat. No. 4,414,269. The crosslinking end cap monomers are readily prepared by the condensation of the corresponding anhydride and a suitable amine, as described in U.S. Pat. No. 4,604,437 with respect to the allyl-substituted or methallyl-substituted methylbicyclo[2.2.1]hept-5-ene-2,3-dicarboximides.

For the $D_i$—A—$D_i$ oligomers, the end cap monomers generally are selected from the group consisting of:

[structure with R, imide, phenyl, W]

[structure with R, G, imide, phenyl, W], or

[structure with RC≡C, phenyl imide, phenyl, W]

wherein
i = 1 or 2 (and, preferably, 2);
G = —SO₂—, —S—, —O—, —SO—, —CH₂—, —CHR—, —CR₂— or —CO—;
R = hydrogen, lower alkyl, or phenyl;
w = —OH, —NH₂, or —COX; and
X = halogen.

Similarly, the end cap monomers for the $Z_k$—B—$Z_k$ oligomers generally are selected from the group consisting of aminophenol, aminobenzoic acid halide, H₂N—φ—SH,

[structure: phenyl-W], or the like, wherein $\phi$=phenyl and W=—OH, —NH$_2$, or —COX. The $Z_k$—B—$Z_k$ oligomers include diamines, dialcohols, or disulfhydryls, as will be explained. In this circumstance, k=1.

Upon curing, the oligomers homopolymerize (i.e. addition polymerize) by crosslinking and form block copolymers through the Michaels addition reaction between the hydrocarbon unsaturation of one oligomer and the amine, hydroxyl, or sulfhydryl group of the other. The reaction of the hydrocarbon unsaturation of one oligomer with the

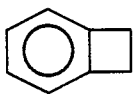

functionality of the other follows the mechanism described in U.S. Pat. No. 4,719,283 to form a cyclohexane linkage.

The Michaels addition reaction is illustrated as follows:

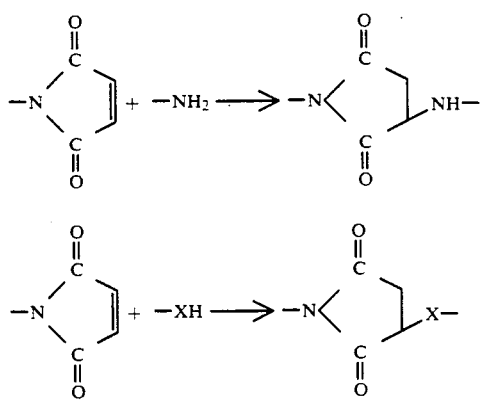

wherein X=—O— or —S—.

We believe that the nadic caps decompose upon heating to form the maleic caps and to release a cyclopentadiene (or related compound), so that the cured composites have the linkages illustrated above when amines, phenols, or sulfhydryls are used.

All reactions used in the preparation of the oligomers should be carried out in suitable solvents and under an inert atmosphere. To prepare imidesulfones, then, of the general formula $D_i$—A—$D_i$ or $Z_k$—B—$Z_k$, the respective amine or anhydride end cap preferably is mixed with a sulfone diamine and a dianhydride. To prepare ethersulfones, the respective hydroxy (i.e., imidophenol) end cap is mixed with suitable dialcohols (i.e., diols) and dihalogens. To prepare amides, the respective amide or acid halide end cap is mixed with suitable dicarboxylic acid halides and diamines.

To prepare ethers, the respective hydroxy (i.e., imido-phenol) end cap is mixed with suitable dialcohols and dihalogens or with suitable dinitrohydrocarbons and dialcohols. To prepare esters, the respective hydroxy or acid halide end cap is mixed with suitable diamines and dianhydrides. To prepare etherimides, the respective amine end caps are reacted with:

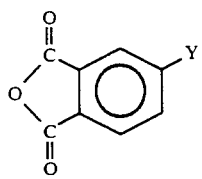

wherein Y=nitro- or halo- to form an imide while leaving an active nitro- or halo-functionality. This intermediate is then mixed with suitable nitro/anhydrides and compounds of the formula: H$_2$N—R—XH, as suggested in our copending patent application 016,703 or U.S. Pat. Nos. 3,847,869 or 4,107,147 (which are incorporated by reference). To prepare amideimides, the method of our copending U.S. patent application Ser. No. 092,740 is used, which comprises condensing simulteneously an amine or acid halide end cap with suitable dicarboxylic acid halides and diamines, wherein either or both of the diamines or diacid halide include intermediate imide linkages. Alternatively, the amideimides can be prepared by condensing the respective amine end cap with suitable dianhydrides and diamines, wherein either or both of the dianhydrides or diamines include amide linkages.

Heterocycle oligomers or heterocycle sulfone oligomers (i.e. oxazole, thiazoles, or imidazoles) are prepared by condensing acid halide end caps with four-functional compounds, like diaminodihydroxybenzene, and dicarboxylic acid halides (or the acids).

The synthesis of these oligomers and the representative classes of reactants will now be presented to illustrate the scope of the invention and to describe the nature of the preferred reactants.

Amideimides are characterized by backbones of two general types, namely:

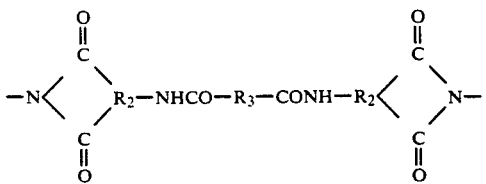

or

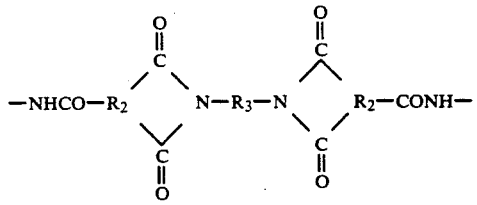

wherein
R$_3$=all aromatic, aliphatic, or alicyclic radical, and preferably a phenoxyphenyl sulfone; and
R$_2$=a trivalent organic radical, and preferably phenyl.

Accordingly, linear polyamideimides include oligomers of the general formula:

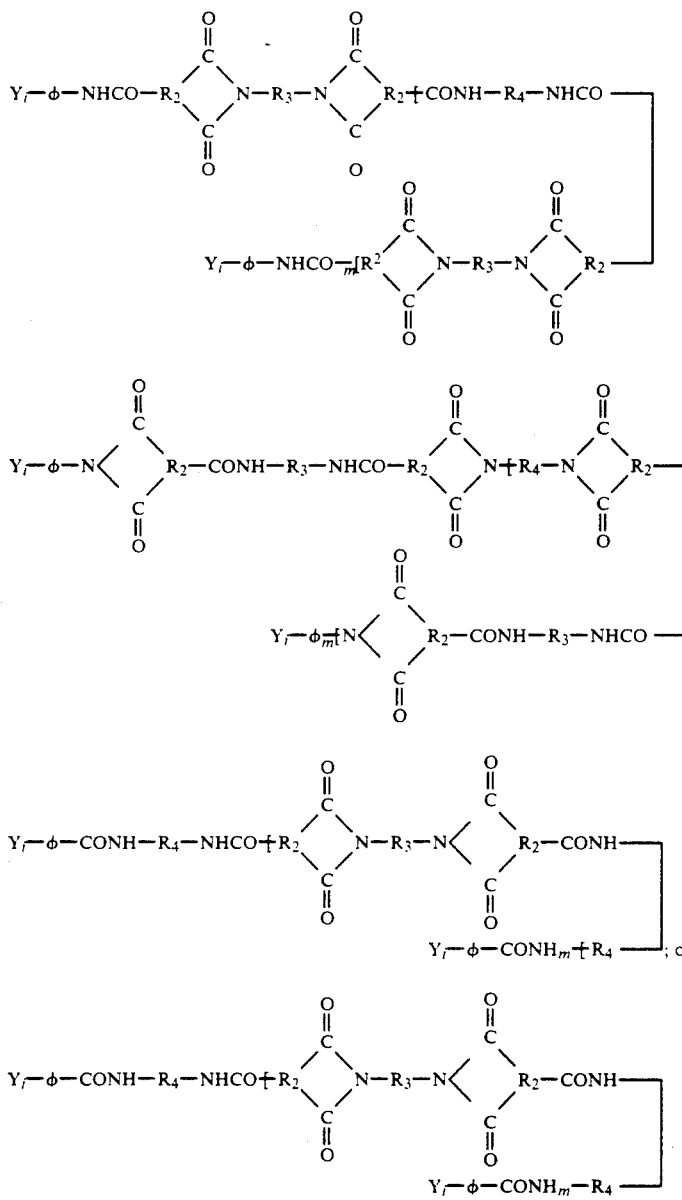

wherein
Y = an end cap residue of either type (i.e. D or Z);
$R_2$ = a trivalent organic radical, and preferably phenyl;
$R_3$ = an aromatic, aliphatic, or alicyclic radical, and preferably a phenoxyphenyl sulfone.
$R_4$ = a divalent organic radical;
m = a small integer, usually from 0–5, but generally sufficiently large to impart thermoplastic properties in the oligomer;
$\phi$ = phenyl; and
i = 1 or 2.

The amideimides are generally made by condensing suitable end cap monomers, diacid halides, diamines, and dianhydrides. The diacid halides can be prepared by condensing 2 moles of an acid halide anhydride of the formula:

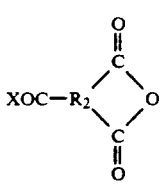

with a diamine of the formula: $H_2N-R_3-NH_2$. The diamine, in this case, can be selected from the group consisting of:

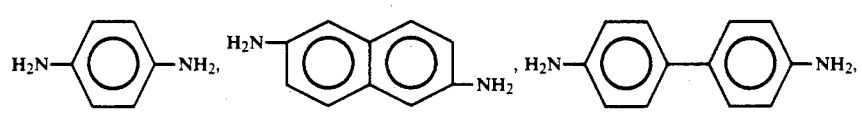

-continued
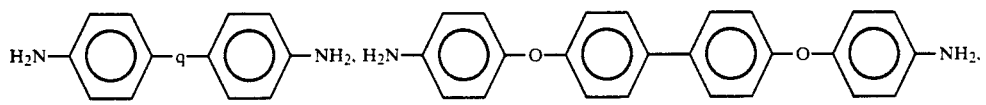
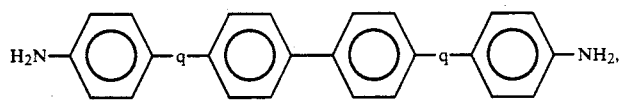
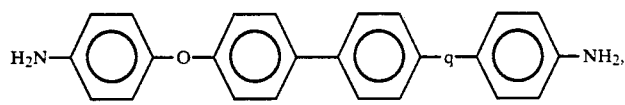
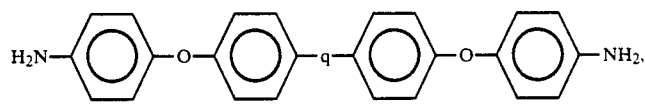
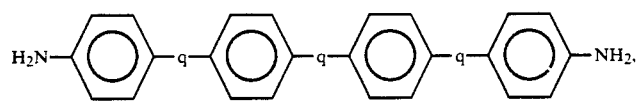
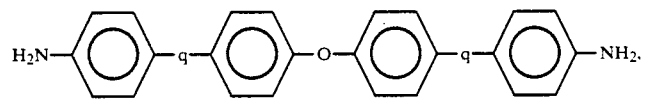
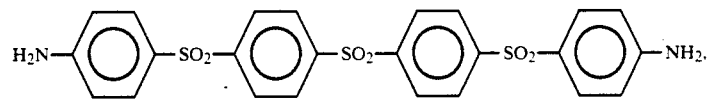
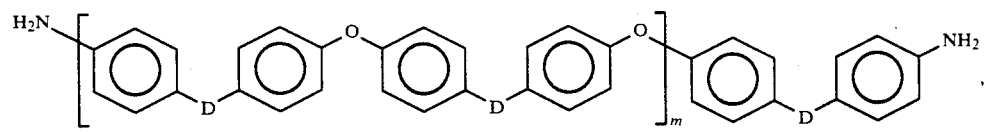
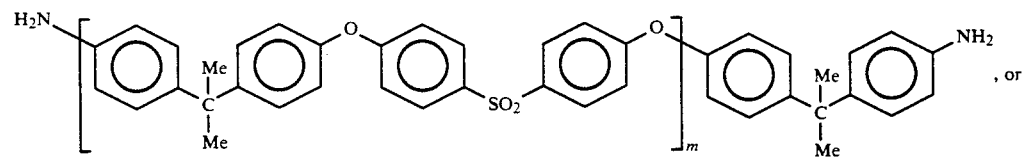, or
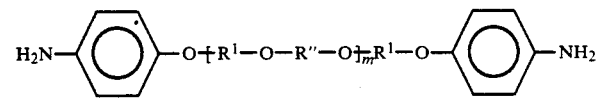
wherein 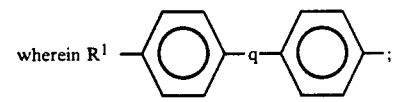;
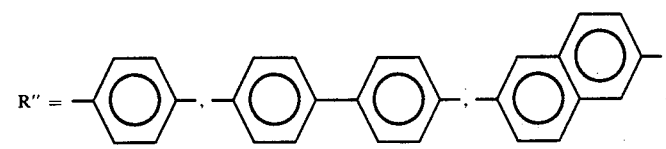

-continued

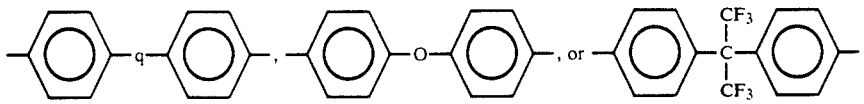

q = —SO$_2$—, —CO—, —S—, or —(CF$_3$)$_2$C—;
Me = methyl;
m = a small integer; and
D = —CO—, —SO$_2$—, —(CF$_3$)$_2$C— or mixtures thereof.

Other diamines that may be used, but that are not preferred, include those described in U.S. Pat. Nos. 4,504,632; 4,058,505; 4,576,857; 4,251,417; and 4,215,418. The aryl or polyaryl "sulfone" diamines previously described are preferred, since these diamines are soluble in conventional synthetic solvents and provide high thermal stability to the resulting oligomers and composites.

Diamines may include "Schiff base" conductive linkages (particularly —N=CH—), analogous to diacid halides which will be described.

Particularly preferred ethersulfone (i.e. phenoxyphenyl sulfone) diamines are those in which R$_1$ is

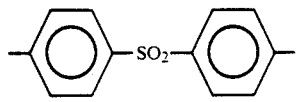

and R" is

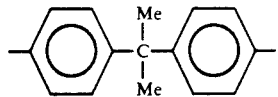

so that the phenoxyphenyl sulfone diamines include:

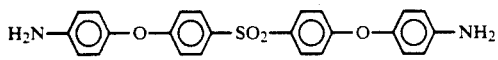

or

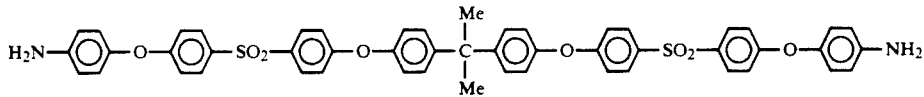

The molecular weights of these diamines varies from about 500 to about 2000. Using lower molecular weight diamines seems to enhance the mechanical properties of the difunctional polyamideimide oligomers, each of which has alternating ether "sulfone" segments in the backbone.

Phenoxyphenyl sulfone diamines of this general nature can be prepared by reacting two moles of aminophenol with (n+1) moles of an aryl radical having terminal, reactive halide functional groups (dihalogens), such as 4,4'-dichlorodiphenylsulfone, and a suitable bisphenol (i.e., dialcohol, dihydric phenol, or diol). The bisphenol is preferably selected from the group consisting of:

2,2-bis-(4-hydroxyphenyl)-propane (i.e., bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydrophenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane;

or mixtures thereof, as disclosed in U.S. Pat. No. 3,262,914. Bisphenols having aromatic character (i.e., absence of aliphatic segments), such as bisphenol-A, are preferred.

The dihalogens in this circumstance preferably are selected from the group consisting of:

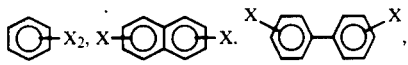

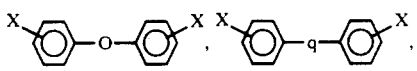

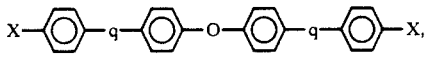

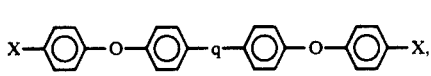

or

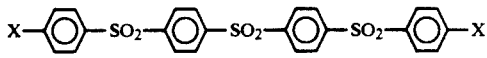

wherein
X = halogen, preferably chlorine; and
q = —S—, —SO$_2$—, —CO—, —(CH$_3$)$_2$C—, and —(CF$_3$)$_2$C—, and preferably either —SO$_2$— or —CO—.

The condensation reaction creates ether diamines that ordinarily include intermediate "sulfone" linkages. The condensation generally occurs through a phenate mechanism in the presence of K$_2$CO$_3$ or another base in a DMSO/toluene solvent. The grain size of the K₂CO₃(s) should fall within the 100–250 ANSI mesh range.

Additional methods for preparing phenoxyphenysulfones of this general type are disclosed in U.S. Pat. Nos. 3,839,287 and 3,988,374.

Any of these diamines might be used as the $Z_k$—B—$Z_k$ oligomer wherein k=1.

The diacid halide or dicarboxylic acid (i.e. dibasic acid) may include an aromatic chain segment selected from the group consisting of:

(a) phenyl; (b) naphthyl; (c) biphenyl;
(d) a polyaryl "sulfone" divalent radical of the general formula:

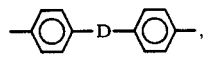

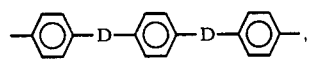

or

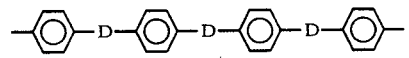

wherein
D=—S—, —O—, —CO—, —SO₂—, —(CH₃)₂C—, —(CF₃)₂C—, or mixtures thereof throughout the chain; or (e) a divalent radical having conductive linkages, illustrated by Schiff base compounds selected from the group consisting of:

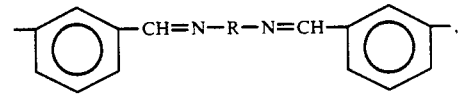

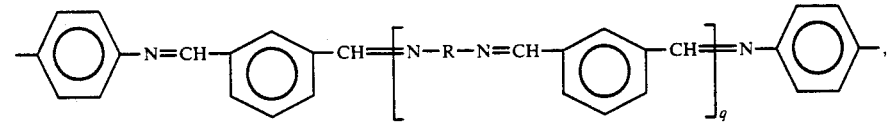

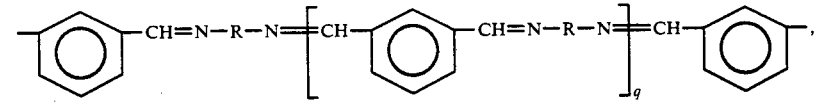

wherein R is selected from the group consisting of: phenyl; biphenyl; naphthyl; or a divalent radical of the general formula:

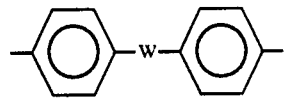

wherein W=—SO₂— or —CH₂—; and q=0–4; or
(f) a divalent radical of the general formula:

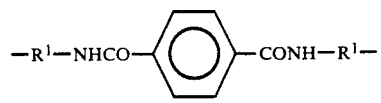

wherein $R^1$ = a $C_2$ to $C_{12}$ divalent aliphatic, alicyclic, or aromatic radical, and, preferably, phenyl (as described in U.S. Pat. No. 4,556,697).

Thiazole, oxazole, or imidazole linkages, especially between aryl groups, may also be used as the conductive linkages to form the conductive or semiconductive oligomers.

The preferred diacid halides include:

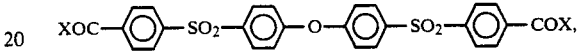

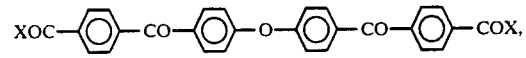

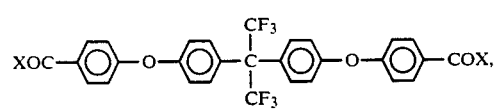

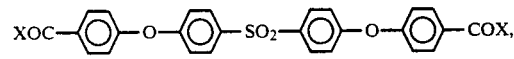

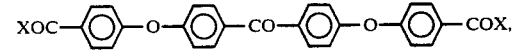

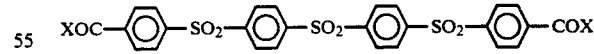

Schiff base dicarboxylic acids and diacid halides can be prepared by the condensation of aldehydes and aminobenzoic acid (or other amine acids) in the general reaction scheme:

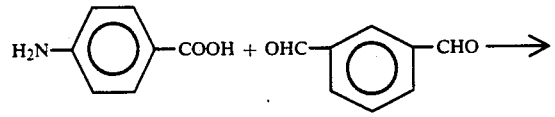

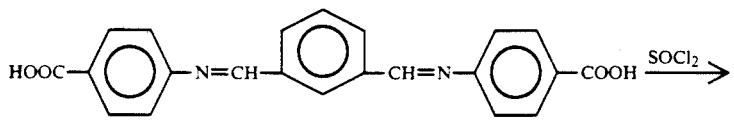

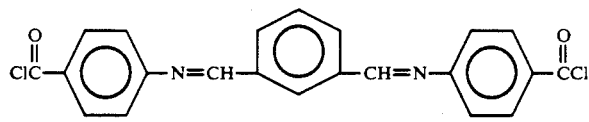

or similar syntheses.

Other diacid halides that can be used, but that are not preferred, are disclosed in U.S. Pat. No. 4,504,632 and include:
adipylchloride,
malonyl chloride,
succinyl chloride,
glutaryl chloride,
pimelic acid dichloride,
suberic acid dichloride,
azelaic acid dichloride,
sebacic acid dichloride,
dodecandioic acid dichloride,
phthaloyl chloride,
isophthaloyl chloride,
terephthaloyl chloride,
1,4-naphthalene dicarboxylic acid dichloride, and
4,4'-diphenylether dicarboxylic acid dichloride.

Polyaryl or aryl diacid halides are preferred to achieve the highest thermal stabilities in the resulting oligomers and composites insofar as aliphatic bonds are not as thermally stable as aromatic bonds. Particularly preferred compounds include intermediate electronegative (i.e., "sulfone") linkages to improve toughness of the resulting oligomers.

The corresponding amideimide of the formula:

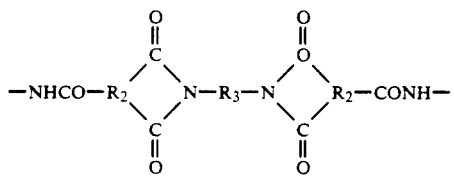

can be prepared if the acid anhydride:

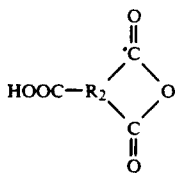

is used instead of the acid halide anhydride. The resulting intermediate products are dicarboxylic acids rather than dianhydrides. These dicarboxylic acids (or their diacid halides) can be used with the diamines previously described.

Dianhydrides useful for the synthesis of amideimides include:
(a) pyromellitic dianhydride,
(b) benzophenonetetracarboxylic dianhydride (BTDA), and
(c) 5-(2,5-diketotetrahydrofuryl)-3-methylcyclohexene-1,2-dicarboxylic anhydride (MCTC), but may be any aromatic or aliphatic dianhydride, such as those disclosed in U.S. Pat. Nos. 3,933,862; 4,504,632; 4,577,034; 4,197,397; 4,251,417; 4,251,418; or 4,251,420. Mixtures of dianhydrides might be used. Lower molecular weight dianhydrides are preferred, and MCTC or other aliphatic dianhydrides are the most preferred for the lower curing polyamideimides having caps with two crosslinking functionalities.

Of course, the dianhydrides also include those intermediates resulting from the condensation of the acid halide anhydride with any of the diamines previously described. Similarly, the dicarboxylic acids and diacid halides include those intermediates prepared by the condensation of the acid anhydride with any of the diamines previously described. The corresponding dicarboxylic acid is converted to the diacid halide (i.e. chloride) in the presence of $SOCl_2$ (thionyl chloride).

The amideimides of the present invention can be synthesized by several schemes, as previously described. To obtain repeating units of the general formula:

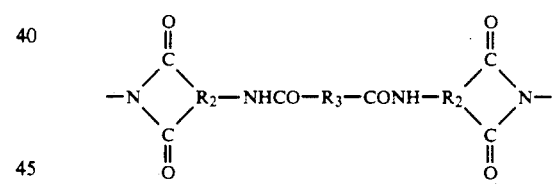

an acid halide anhydride particularly

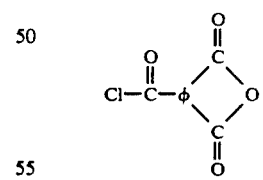

can be mixed with a diamine and with an amine end cap in the ratio of n: n: 2 wherein n = an integer greater than or equal to 1. In this reaction, the acid halide anhydride will react with the diamine to form an intermediate dianhydride which will condense with the diamine and amine end cap. The reaction may be carried out in two distinct stages under which the dianhydride is first prepared by mixing substantially equimolar amounts (or excess diamine) of the acid halide anhydride and diamine followed by the addition of a mixture of the diamine and the end cap. Of course, the diamine used to form the dianhydride may differ from that used in the second stage of the reaction, or it may be a mixture of diamines from the outset.

The related amideimide having repeating units of the general formula:

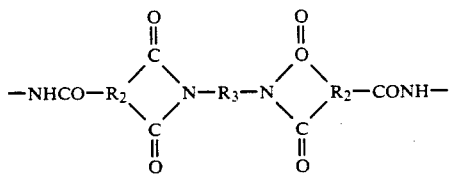

can be synthesized by reacting the acid anhydride with the diamine to form intermediate dicarboxylic acids, which can then react with more diamine or an amine end cap to complete the oligomer. Again, the reaction can be separated into steps.

The amideimide oligomers (as with all oligomers) appear to possess greater solvent resistance if the condensation of the dianhydride/dicarboxylic acid with the diamine and end cap is done similtaneously rather than sequentially.

While use of an amine end cap has been described above, corresponding oligomers can be formed by using an acid halide end cap, if the diamine is provided in excess. In this case the reaction mixture generally comprises the acid halide anhydride or the acid anhydride, the end cap, and the diamine and the synthesis is completed generally in one step.

All reactions should be conducted under an inert atmosphere and at elevated temperatures, if the reaction rate needs to be increased. The reaction mixture should be well stirred throughout the synthesis. Chilling the reaction mixture can slow the reaction rate and can assist in controlling the oligomeric product.

As suggested in U.S. Pat. No. 4,599,383, the diamine may be in the form of its derivative OCN—R—NCO, if desired.

The amideimides described in U.S. Pat. Nos. 4,599,383; 3,988,374; 4,628,079; 3,658,938; and 4,574,144 can all be capped with the crosslinking misnomers of the present invention to convert the polymers to coreactive oligomers that are suitable for forming advanced composites.

Polyetherimides and polysulfoneimides are capped to form oligomers that are suitable for use in the coreactive oligomer blends. Preferred compounds have the general formula:

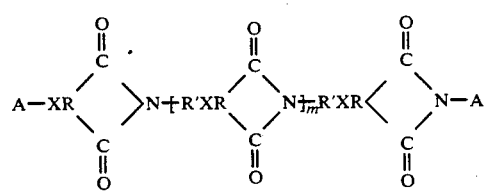

wherein
X=—O— or —S—;

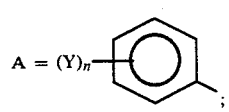

n=1 or 2;

Y=an end cap residue of either type, as previously defined;

R=a trivalent $C_{(6-13)}$ aromatic organic radical;

$R_1$=any of lower alkyl, lower alkoxy, aryl, or substituted aryl (including hydroxyl or halo substituents); and R'=a divalent $C_{(6-30)}$ aromatic organic radical.

The polyetherimide oligomers can be prepared by several reaction schemes. One such method comprises the simultaneous condensation of:

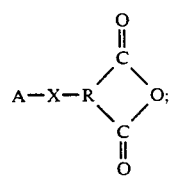  (I)

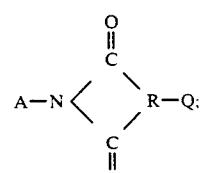  (II)

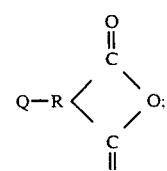  (III)

and $H_2N$—R'—X—H  (IV)

in the ratio of I:II:III:IV=1:1:m:m, wherein m is an integer greater than or equal to one and Q=halo- or nitro-. The product has the general formula previously described. The reaction occurs in a suitable solvent under an inert atmosphere. If necessary, the reaction mixture can be heated to facilitate the reaction. The reaction conditions are generally comparable to those described in U.S. Pat. Nos. 3,847,869 and 4,107,147.

Preferably the etherimide oligomers possess thermoplastic properties, and, accordingly, have an average formula weight of between about 5,000–40,000, and generally 20,000–30,000.

Alternatively, the polyetherimides can be prepared by reacting a polyetherimide polymer made by the self-condensation of a phthalimide salt of the formula:

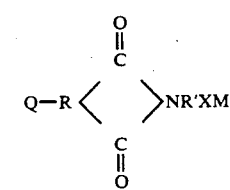

with crosslinking end cap moieties of the formulae:

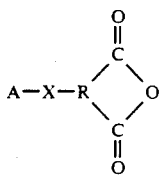

and

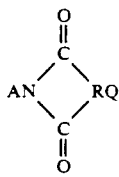

wherein
X=—O— or —S—;

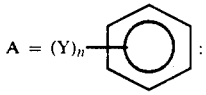

n=1 or 2;
Y=an end cap residue as previously described;
Q=halo- or nitro- ;

or dihydric phenol), and 2 moles of A—OH in a suitable solvent under an inert atmosphere. Here, the dialcohol may actually be in the form of a phenate.

In this reaction, the diamines (which preferably have aromatic ethersulfone backbones) react with the anhydride to form intermediates of the following nature in the backbone:

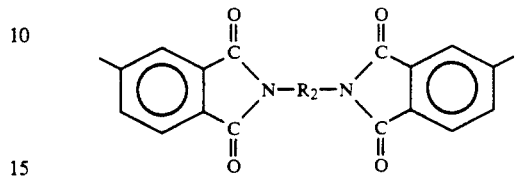

wherein $R_2$=a residue of the diamine. Similarly, the dialcohol reacts with the nitro-functionality to form an ether linkage of the general formula:

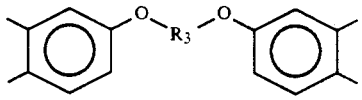

wherein
$R_3$=a residue of the dialcohol.

The A—OH end caps quench the polymerization. The resulting polyetherimides have the general formula:

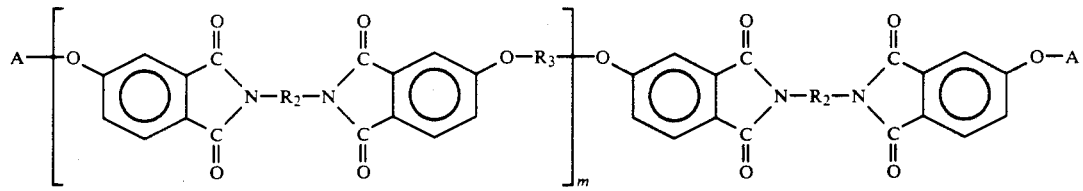

$R'$=a divalent $C_{(6-30)}$ aromatic organic radical, and
M=an alkali metal ion or ammonium salt or hydrogen.

The self-condensation proceeds as described in U.S. Pat. No. 4,297,474 in a dipolar aprotic solvent. The end cap moieties can be introduced during the self-condensation to quench the polymerization, or they might be added following completion of the polymerization and recovery of the polyetherimide polymer from methanol. Improved solvent resistance on the cured composites is best achieved, however, by the quenching sequence rather than by the capping sequence which follows polymerization.

Yet another preferred method for synthesizing the polyetherimides of the present invention involves the simultaneous condensation of about 2m+2 moles of nitrophthalic anhydride with about m+1 moles of diamine, about m moles of dialcohol (i.e., bisphenol, diol, Another preferred synthesis comprises the simultaneous condensation of about 2m+2 moles of nitrophthalic anhydride with about m+1 moles of dialcohol, m moles of diamine, and 2 moles A—NH$_2$ in a suitable solvent under an inert atmosphere. Again, the dialcohol may be in the phenate form. The resulting oligomer has a general formula:

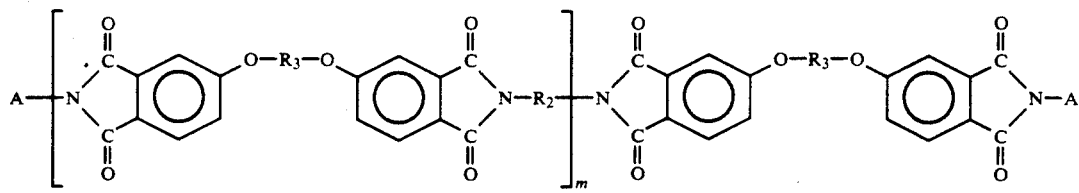

Yet another preferred synthesis comprises the simultaneous condensation of 2m moles of nitrophthalic anhydride with about m+1 moles of dialcohol, m moles of diamine, and 2 moles of A—NO$_2$ (a nitro-terminated end cap) in a suitable solvent under an inert atmosphere. Again, the dialcohol may be in the phenate form or a corresponding sulfyhdryl (thio) can be used to form a thioether. The resulting oligomer has the general formula:

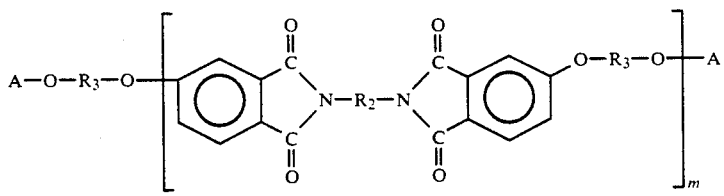

In any of the syntheses, the dialcohol can be replaced by a comparable disulfhydryl of the formula: HS—R$_2$—SH. Mixtures of dialcohols, or disulfhydryls, or dialcohols and disulfhydryls can be used.

Although the bisphenols previously described can be used, for etherimides, the dialcohol is generally a polyaryl compound and preferably is selected from the group consisting of:

HO—Ar—OH;

HO—Ar—L—Ar'—L—Ar—OH;

HO—Ar'—L—Ar—L—Ar'—OH;

wherein
L = —CH$_2$—, —(CH$_3$)$_2$C—, —(CF$_3$)$_2$C—, —O—, —S—, —SO$_2$— or —CO—;

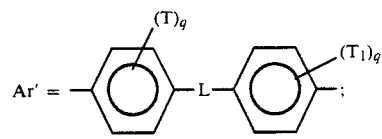

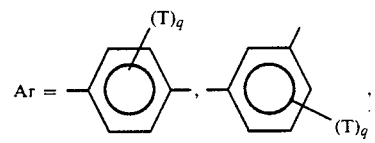

-continued

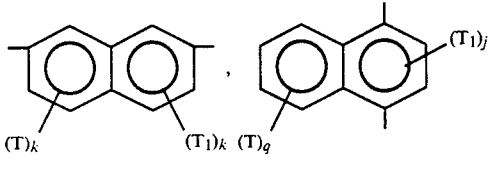

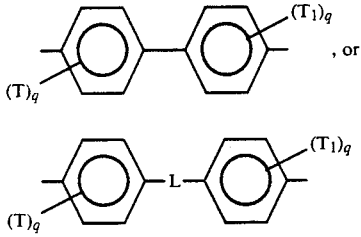

T and T$_1$ = lower alkyl, lower alkoxy, aryl, aryloxy, substituted alkyl, substituted aryl, halogen, or mixtures thereof;
q = 0–4;
k = 0–3; and
j = 0, 1, or 2.

The dialcohols also include hydroquinone; bisphenol-A; p,p'-biphenol; 4,4'-dihydroxydiphenylsulfide; 4,4'-dihydroxydiphenylether; 4,4'-dihydroxydiphenylisopropane; 4,4'-dihydroxydiphenylhexafluoropropane; a dialcohol having a Schiff base segment, the radical being selected from the group consisting of:

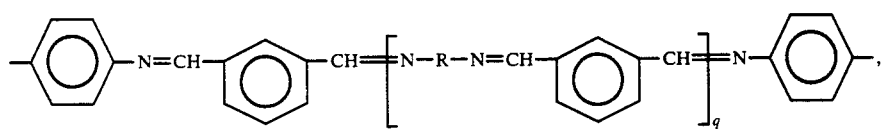

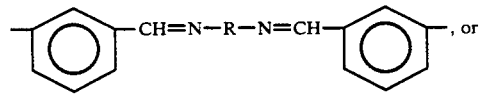

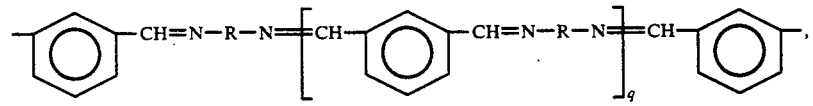

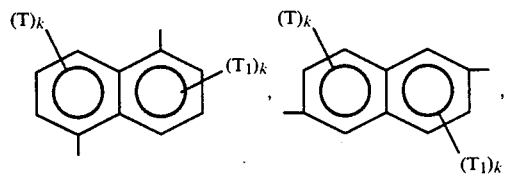

wherein R is selected from the group consisting of:
phenyl;
biphenyl;
naphthyl; or
a radical of the general formula:

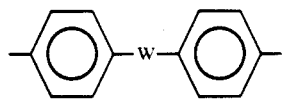

wherein W = —CH$_2$— or —SO$_2$—; or a dialcohol selected from the group:

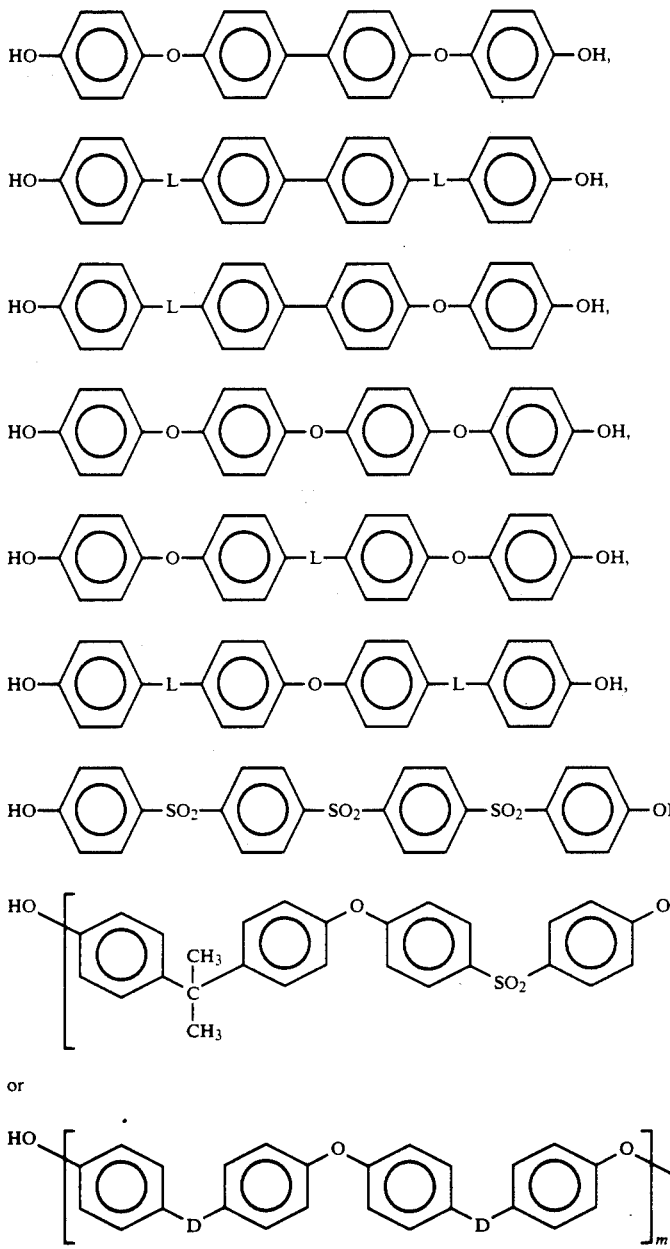

wherein
L is as defined above;
Me = methyl;
m = an integer, generally less than 5, and preferably 0 or 1; and
D = any of —CO—, —SO$_2$—, or —(CF$_3$)$_2$C—.

While bisphenol-A is preferred in the etherimide synthesis (because of cost and availability), the other dialcohols can be used to add rigidity to the oligomer without significantly increasing the average formula weight, and, therefore, can increase the solvent resistance. Random or a block copolymers are possible.

These dialcohols can be used as the $Z_k$—B—$Z_k$ oligomers wherein k = 1.

Furthermore, the dialcohols may also be selected from the those described in U.S. Pat. Nos. 4,584,364; 3,262,914; or 4,611,048. The hydroxy-terminated etherimides of U.S. Pat. No. 4,611,048 can be reacted with A—NO$_2$ to provide crosslinking etherimides of the present invention.

Dialcohols of this nature are commercially available. Some may be easily synthesized by reacting halide intermediates with bis-phenates, such as by the reaction of 4,4'-dichlorodiphenylsulfone with bis(disodium biphenolate).

The oligomers can be synthesized in a homogeneous reaction scheme wherein all the reactants are mixed at one time (and this scheme is preferred), or in a stepwise reaction. The diamine and dialcohols can be mixed, for example, followed by addition of the nitrophthalic anhydride to initiate the polymerization and thereafter the end caps to quench it. Those skilled in the art will recognize the different methods that might be used. To the extent possible, undesirable competitive reactions should be minimized by controlling the reaction steps (i.e., addition of reactants) and the reaction conditions.

Suitable diamines include those diamines described with reference to the amideimide synthesis.

Anhydrides of the formula:

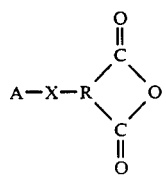

wherein X=—O— or —S—;
R=a trivalent $C_{(6-13)}$ aromatic organic radical;

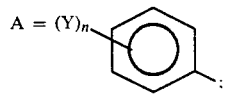

n=1 or 2; and
Y=an end cap residue (i.e., either D or Z),
are useful in the synthesis of the etherimides of the present invention, and are prepared by the condensation of the corresponding end cap phenol or thiol (—XH) with a nitro- or halo- anhydride that contains the R moiety.

In at least one synthesis of the etherimides, a compound of the formula:

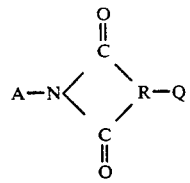

is an intermediate or reactant, wherein:
R=a trivalent $C_{(6-13)}$ aromatic organic radical

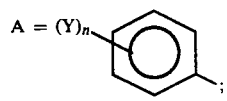

n=1 or 2;
Y=an end cap residue as previously defined; and
Q=halo- or nitro-.

This intermediate if formed by reacting A—NH$_2$ with a substituted phthalic anhydride of the formula:

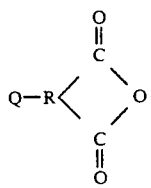

These substituted anhydrides are described in U.S. Pat. Nos. 4,297,474 and 3,847,869.

Polysulfoneimide oligomers corresponding to the etherimides can be prepared by reacting about m+1 moles of a dianhydride with about m moles of a diamine and about 2 moles of an amine end cap (A—NH$_2$). The resulting oligomer has the general formula:

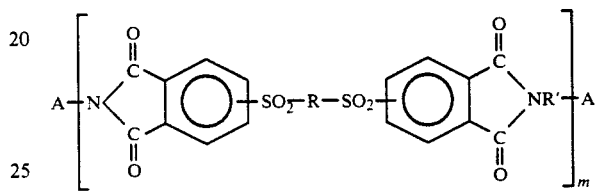

wherein R and R' are divalent aromatic organic radicals having from 2-20 carbon atoms. R and R' may include halogenated aromatic $C_{(6-20)}$ hydrocarbon derivatives; alkylene radicals and cycloalkylene radicals having from 2-20 carbon atoms; $C_{(2-8)}$ alkylene terminated polydiorganosiloxanes; and radicals of the formula:

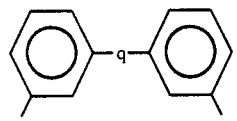

wherein q=—$C_yH_{2y}$—, —CO—, —SO$_2$—, —O—, or —S—; and
y=1 to 5.

Comparable polymers, usable in blends of the sulfoneimides, are described in U.S. Pat. No. 4,107,147, which is incorporated by reference. Other aromatic dithio dianhydrides are described in U.S. Pat. No. 3,933,862.

Heterocycle or heterocycle sulfone oligomers can be prepared by the condensation of:
(a) 2 moles of an amine, phenol, or sulfhydryl end-cap monomer;
(b) n moles of a four-functional compound, and
(c) (n+1) moles of a suitable dicarboxylic acid halide, or by the condensation of:
(a) 2 moles of an acid halid end-cap monomer;
(b) (n+1) moles of a four-functional compound; and
(c) n moles of a dicarboxylic acid halide.

Suitable diacid halides include those compounds described with the reference to the amideimide syntheses.

The four-functional compound has the general formula:

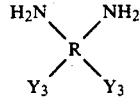

wherein R is an hydrocarbon radical (preferably, an aromatic radical, if the highest thermal stability is sought); $Y_3 =$ —OH, —NH$_2$, or —SH; and the amine functionalities (—NH$_2$) are not substituted on the same carbon atom as the $Y_3$ substituents. The four-functional compound generally is selected from the group consisting of: dihydoxybenzidine, dimercaptobenzidine, dihydroxydiaminobenzene, dimercaptodiaminobenzene, diaminobenzidine, or a compound having the general formula:

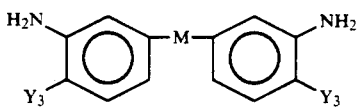

wherein M= —CO—, —SO$_2$, —(CF$_3$)$_2$C—, —S—, or —O—.

Isomers of the four-functional compound may also be used so long as the isomers include two pairs of an amine and a "$Y_3$" functionality on adjacent carbons on an aromatic radical.

The resulting oligomers include oxazole, thiazole, or imidazole linkages. Preferred heterocycle oligomers have an average formula weight between about 500 and about 30,000; more preferably, between about 1,000 to 20,000; and most preferably between about 1,000 to 5,000.

Capped polyimides are prepared by reacting diamines and dianhydrides. Preferred polyimides include thermoplastic oligomers having one crosslinking functionality on each end and ethersulfone segments alternating with segments formed from unsaturated, aliphatic dianhydrides, like MCTC, as described in our copending U.S. patent application Ser. No. 046,376. The polyimides are prepared by reacting:

(1) 2 moles of a monoanyhydride end cap;
(2) n+1 moles of the diamine; and,
(3) n moles of the dianhydride;

wherein n is selected so that the oligomer has an average molecular weight between about 5,000 and 40,000, preferably between about 10,000 and 35,000, and more preferably between 20,000 and 30,000.

The preferred anhydride end caps in this case have the general formula:

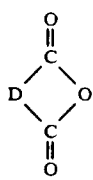

wherein D =

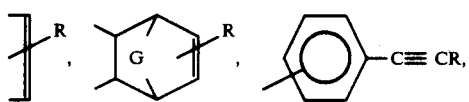

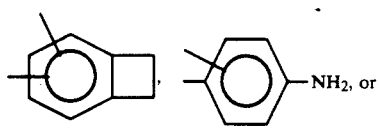

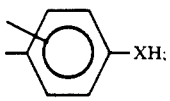

and R, G, and X are as previously defined.

Corresponding polyimide oligomers can be prepared using 2 moles of an amine end cap with n moles of diamine and (n+1) moles of dianhydride. These polyimides can have one or two crosslinking sites at each end of the molecules, since the amine end caps generally have the formula:

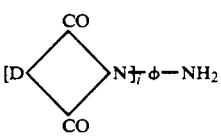

wherein D is defined above and i=1 or 2. Of course, aminophenol or its thio counterpart can be used to provide a monofunctional, capped oligomer that includes an active —OH or —SH functionality.

As previously discussed, preferred diamines for the polyimide condensation include diamines of the general formula:

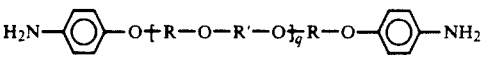

wherein R and R' are aromatic radicals, at least one of R and R' being a diaryl radical wherein the aryl rings are joined by a "sulfone" (i.e. electronegative) linkage, and q is an integer from 0 to 27 inclusive. Preferably R is selected from the group consisting of:

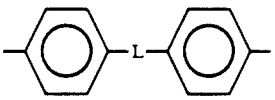

wherein L= —SO$_2$—, —(CF$_3$)$_2$C—, or —S—. R' is preferably selected from the group consisting of:

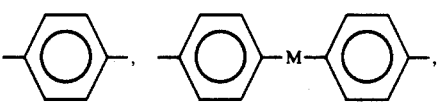

or

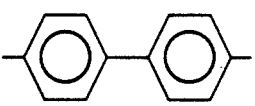

wherein M= —SO$_2$—, —S—, —O—, —(CH$_3$)$_2$C—, or —(CF$_3$)$_2$C—.

Preferred diamines are those in which R is

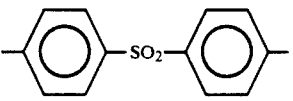

and R" is

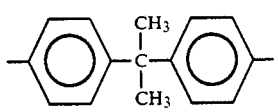

Accordingly, the diamines generally contain at least one phenoxyphenylsulfone group, such as:

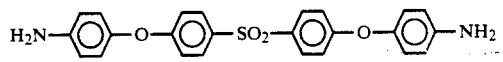

and

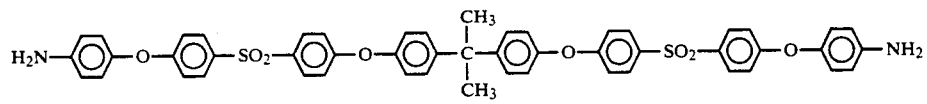

These diamines have alternating ether and "sulfone" linkages, wherein "sulfone" designates an electronegative linkage (—M—) as previously defined.

The molecular weights of the preferred aryl diamines described above vary from approximately 500–10,000. The amino groups and other substituents can be positioned either para or meta, as previously discussed. Lower molecular weight diamines are preferred.

In these monofunctional, thermoplastic, crosslinkable, polyimide oligomers, the dianhydride preferably is 5-(2,5-diketotetrahydrofuryl)-3-methyl-3-cyclohexene-1,2-dicarboxylic anhydride (MCTC), an unsaturated, aliphatic dianhydride.

The diamines and dianhydrides react to form repeating imide linkages along the generally linear backbone of the oligomers. Preferred properties in the oligomer are obtained when the backbone is periodically disrupted by the inclusion of an aliphatic moiety, especially an MCTC residue.

Diamines which include phenoxyphenylsulfone moieties are preferred, since these diamines provide the blend of physical properties in the oligomers which are desired. Impact resistance and toughness is afforded with the electronegative "sulfone" linkages which act as joints or swivels between the aryl groups. The aliphatic residues, such as MCTC, provide lower melt temperatures, and allow the use of lower temperature end caps, such as oxynadic and dimethyl oxynadic (DONA) end caps. The resulting oligomers cure at lower temperatures than other solvent-resistant oligomers, have the desirable features of polyimides, and have better solvent-resistance than conventional polyimides, such as those described in U.S. Pat. Nos. 3,998,786 or 3,897,395 (D'Alelio).

For the difunctional crosslinking polyimides, the suitable diamines include all those previously described with respect to the amideimide condensation and those with respect to the monofunctional imide condensation. The dianhydrides include any or a mixture of the dianhydrides previously described.

The most preferred linear polyimides are prepared with dianhydrides selected from para- and meta- dianhydrides of the general formula:

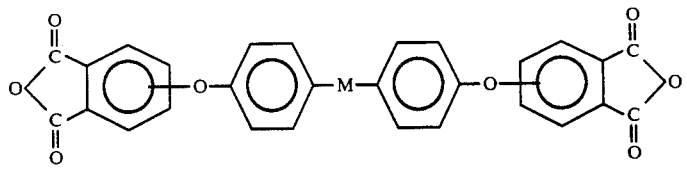

wherein M = —SO$_2$— or —CO—, reacted with 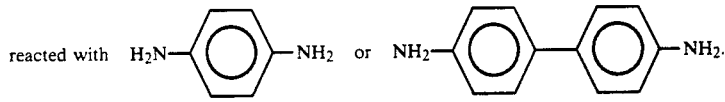

Thermal stabilities in excess of 800° F. are believed to be achievable with these oligomers.

Solvent resistant, thermoplastic aromatic poly(imidesulfone) oligomers are also described in U.S. Pat. Nos. 4,398,021 and 4,489,027. Melt-fusible polyimides made by the condensation of dianhydrides and diamines are described in U.S. Pat. No. 4,485,140.

The polyimide oligomers may be used to form prepregs by the conventional method of impregnating a suitable fabric with a mixture of the oligomer and a solvent. Suitable coreactants, such as p-phenylenediamine, benzidine, and 4,4'-methylenedianiline, may be added to the solvent when preparing prepregs.

Polyamides are prepared by condensing dicarboxylic acid halides with diamines in the presence of acid halide or amine end caps. These polyamides are formed from the diacid halides and diamines that have previously been described.

Polyesters are prepared by condensing diacid halides and dialcohols using any of those compounds previously described. Polyethers or ethersulfones are prepared by condensing dinitro compounds or dihalogens and dialcohols or by other conventional syntheses wherein suitable end-cap monomers are added to quench the synthesis and to provide one or more coreactive functionalities at each end of the molecules.

The dihalogen is generally a compound selected from those described previously with respect to the synthesis of diamines. Dinitro compounds are generally prepared by reacting nitrophthalic anhydride with the diamines. Of course, dihalogens can be prepared in the same way by replacing the nitrophthalic anhydride with halophthalic anhydride. Nitroaniline, nitrobenzoic acid, or nitrophenol may also be condensed with dianhydrides dicarboxylic acid halides, diamines, dialcohols, or dihalogeus to prepare other dinitro compounds that include amide, imide, ether, or ester linkages between the terminal phenyl radicals and the precursor backbones. The synthesis of the dinitro compounds or dihalogens can occur prior to mixing the other reactants with these compounds or the steps can be combined in suitable circumstances to directly react all the precursors into the oligomers. For example, a polyether oligomer can be prepared by simultaneously condensing a mixture of an end cap imidophenol (such as a compound described in U.S. Pat. No. 4,661,604), nitrophthalic anhydride, phenylene diamine, and HO—$\phi$—O—$\phi$—O—$\phi$—O—$\phi$—OH, wherein $\phi$=phenyl.

While other common resin backbones may be capped in a corresponding manner and used in coreactive oligomer blends of the present invention, the linear backbones described above are the most directly suited for aerospace applications. The coreactive oligomer blends of the present invention also include multidimensional oligomers and polymers.

A mutidimensional oligomer includes an aromatic hub and three or more radiating chains or arms, each chain terminating with a crosslinking end cap segment. Each chain includes the resin linkages previously described. Each chain is substantially the same. For example, a multidimensional ether can be prepared by the simultaneous condensation of phloroglucinol with a dihalogen and an imidophenol end cap monomer.

In multidimensional oligomers the higher density of crosslinking functionalities in a multidimensional array provides increased thermo-oxidative stability to the cured composites. Usually the hub will have three radiating chains to form a "Y" pattern. In some cases, four chains may be used. Including more chains leads to steric hindrance as the hub is too small to accommodate the radiating chains. A trisubstituted phenyl hub is highly preferred with the chains being symmetrically placed about the hub. Biphenyl, naphthyl, azaline (e.g., melamine), or other aromatic moieties may also be used as the hub radical.

Details of the several preferred multidimensional oligomers will now be described in a manner similar to that used for the linear oligomers.

Multidimensional polyamideimide oligomers include oligomers of the general formula:

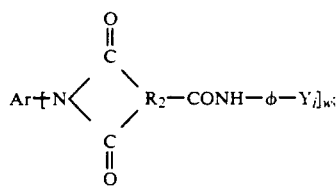

(e)

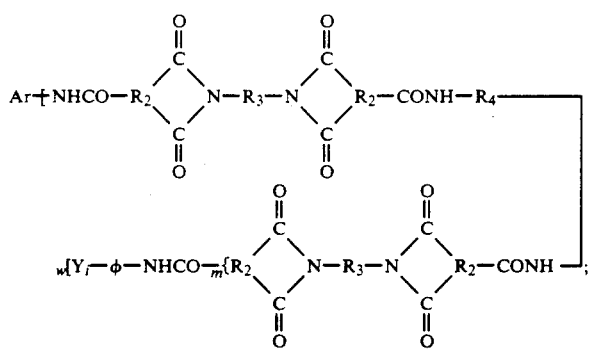

(f)

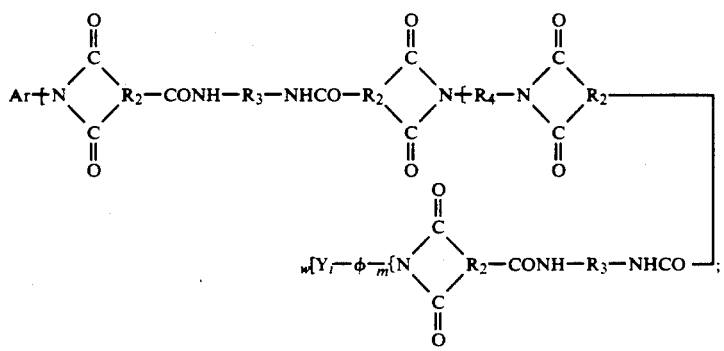

(g)

-continued
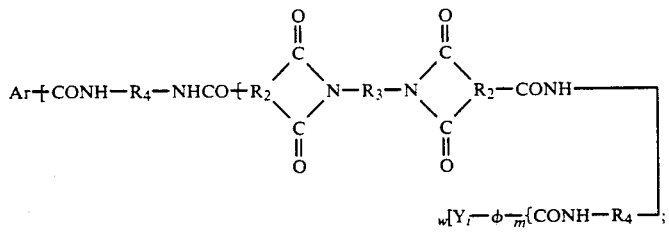 (h)
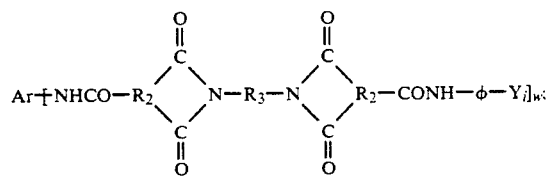 (i)
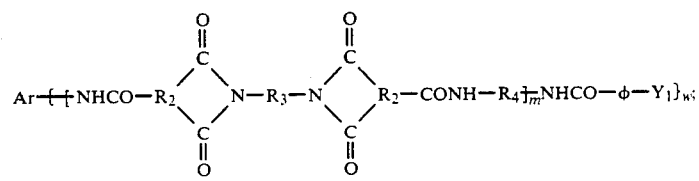 (j)
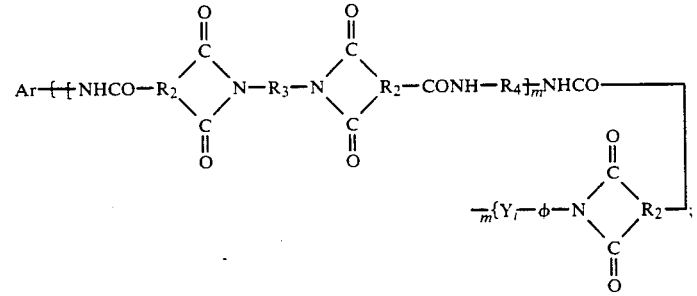 (k)
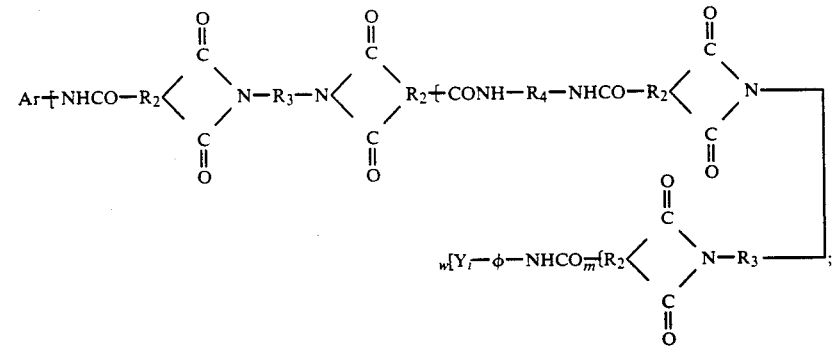 (l)
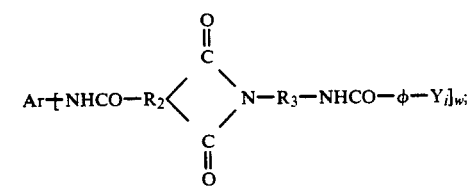 (m)
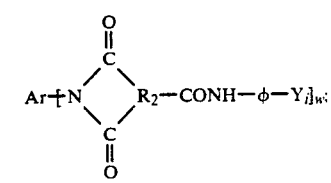 (n)

-continued
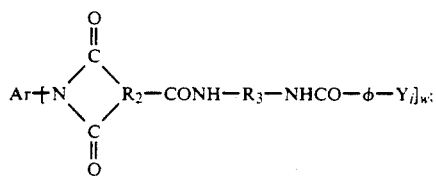 (o)
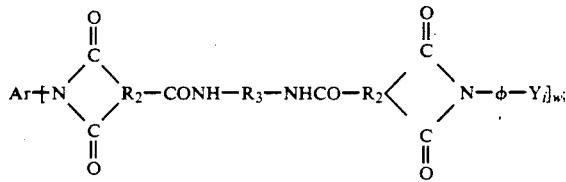 (p)
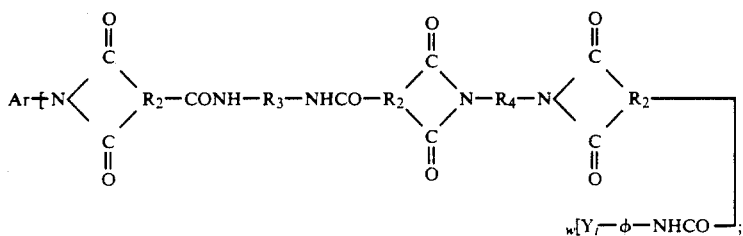 (q)
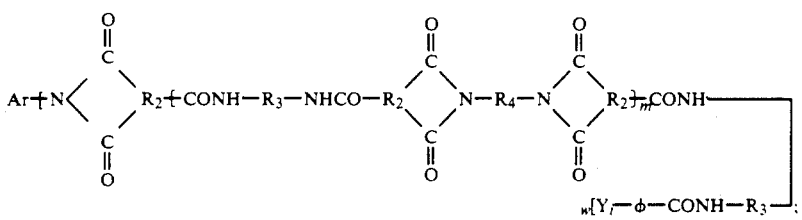 (r)
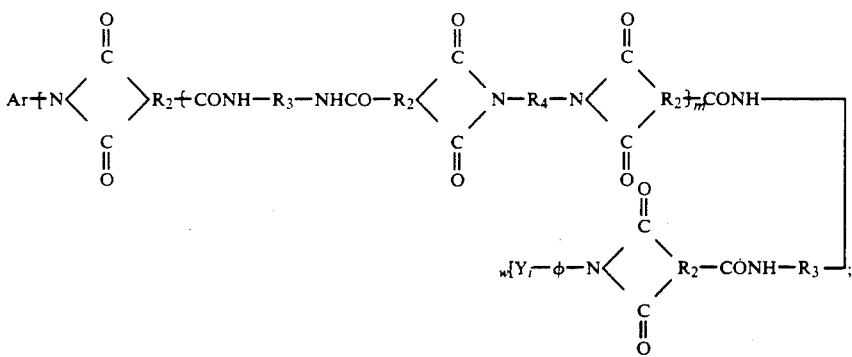 (s)
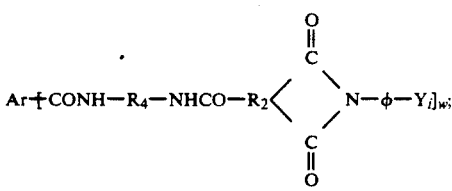 (t)
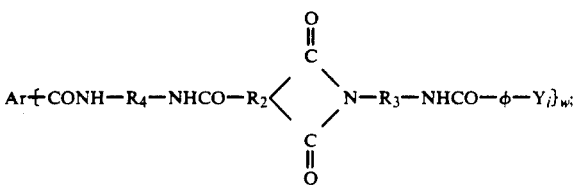 (u)
or

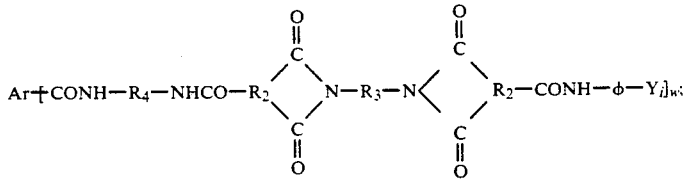 (v)

wherein Y, $R_2$, $R_3$, $R_4$, and m are as previously defined with respect to the linear amideimides, Ar = an organic radical of valency w; $\phi$ = phenyl, and w = 3 or 4. Preferably, Ar is an aromatic radical (generally phenyl) generally selected from phenyl, naphthyl, biphenyl, azalinyl (such as melamine), or triazine derivatives of the general formula:

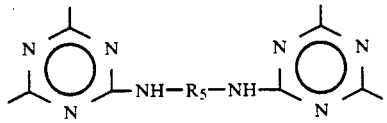

wherein $R_5$ = a divalent hydrocarbon residue containing 1-12 carbon atoms, as described in U.S. Pat. No. 4,574,154.

The hub may also be a residue of an etheranhydride of the formula:

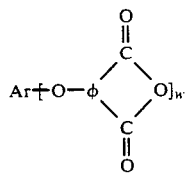

or an etheramine of the formula:

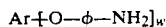

The best results are likely to occur when the arm length of the oligomers is as short as possible (to allow ease of processing) and the oligomer has six crosslinking sites (to allow the highest density of crosslinking). The most preferred hub includes the phenyl radical, since these compounds are relatively inexpensive, are more readily obtained, and provide oligomers with high thermal stability.

The chains of the oligomers include crosslinking end caps which improve the solvent-resistance of the cured composites. These end caps may be thermally or chemically activated during the curing step to provide a strongly crosslinked, complex, multi-dimensional array of interconnected oligomers.

The oligomers may be formed by the attachment of arms to the hub followed by chain extension and chain termination. For example, trihydroxybenzene may be mixed with p-aminophenol and 4,4'- dibromodiphenylsulfone and reacted under an inert atmosphere at an elevated temperature to achieve an amino-terminated "star" of the general formula:

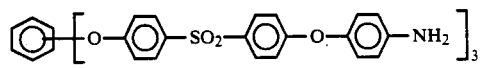

that can be reacted with suitable diacid halides, diamines, and end caps to yield a polyamideimide oligomer.

The etheranhydride hub can be synthesized by reacting nitrophthalic anhydride or halophthalic anhydride with Ar$\pm$(OH)$_w$ in a suitable solvent under an inert atmosphere, as described generally in our copending application, U.S. Ser. No. 016,703 and in U.S. Pat. No. 3,933,862 (thio-analogs).

The oligomers of course, might be made by reacting nitrophthalic anhydride with an amine end cap followed by the condensation with the hydroxy hub or in similar reaction schemes that will be understood by those of ordinary skill.

The oligomers can be synthesized in a homogeneous reaction scheme wherein all the reactants are mixed at one time, or in a stepwise reaction scheme wherein the radiating chains are affixed to the hub and the product of the first reaction is subsequently reacted with the end cap groups. Of course, the hub may be reacted with end-capped arms that include one reactive, terminal functionality for linking the arm to the hub. Homogeneous reaction is preferred, resulting undoubtedly in a mixture of oligomers because of the complexity of the reactions. The products of the processes (even without distillation or isolation of individual species) are preferred oligomer mixtures which can be used without further separation to form the desired advanced composites.

Linear or multidimensional oligomers can be synthesized from a mixture of four or more reactants so that extended chains may be formed. Adding components, however, adds to the complexity of the reaction and of its control. Undesirable competitive reactions may result or complex mixtures of macromolecules having widely different properties may be formed, because the chain extenders and chain terminators are mixed, and compete with one another.

Multidimensional etherimides can be made by reacting the etheranhydride hub with compounds of the formulae II, III, and IV previously described.

Multidimensional amides are prepared by condensing a nitro, amine, or acid halide hub with suitable diamines, dicarboxylic acid halides, and amine or acid halide end cap monomers to form oligomers of the general formulae:

Ar—[—CONH—P—NHCO—Q—CONH—$\phi$—D$_j$]$_w$;

Ar—[—NHCO—Q—CONH—P—NHCO—$\phi$—D$_j$]$_w$;

Ar—[—CONH—$\phi$—D$_j$]$_w$;

Ar—[—NHCO—$\phi$—D$_j$]$_w$;

Ar―[―CONH―P―NHCO―φ―D<sub>i</sub>]<sub>w</sub>; or

Ar―[―NHCO―Q―CONH―φ―D<sub>i</sub>]<sub>w</sub>.

wherein Ar, w, —φ—, i, and D are as previously defined, P=a residue of a diamine, and Q=a residue a dicarboxylic acid halide. If made using the preferred anhydride end cap monomers of the formula:

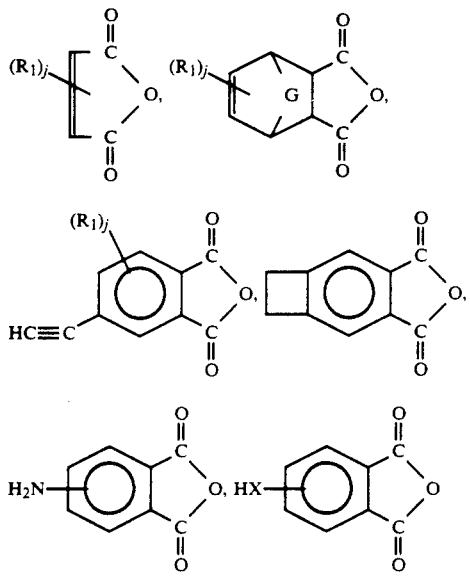

the multidimensional oligomers include those of the formulae:

Ar―[―COHN―P―N―E]<sub>n</sub>;

Ar―[―]―COHN―P―NHCO―Q<sub>m</sub>―]―CON-H―P―N―E}<sub>n</sub>; or

Ar―[―]―NHCO―Q―CONH―P<sub>m</sub>―]―N―E}<sub>n</sub> wherein E=a residue of the above identified anhydrides, and P and Q as previously described.

Multidimensional imides can be made using the amine, etheranhydride, or etheramine hubs with suitable diamines, dianhydrides, and amine or anhydride end caps, as will be understood by those of ordinary skill. Particularly preferred multidimensional imides include those prepared by condensing anhydride end caps directly with the amine hubs.

Multidimensional polyesters can be made using hydroxy or carboxylic acid hubs (particularly cyuranic acid) with suitable diols and diacid halides. Carboxylic acid hubs include those compounds described in U.S. Pat. No. 4,617,390 and compounds prepared by reacting polyols, such as phloroglucinol, with nitrobenzoic acid or nitrophthalic acid to form ether linkages and active, terminal carboxylic acid funtionalities. The nitrobenzoic acid products would have three active sites while the nitrophthalic acid products would have six; each having the respective formula:

φ―[―O―φ―COOH]<sub>3</sub> or φ―[―O―φ―(COOH)<sub>2</sub>]<sub>3</sub> wherein φ=phenyl. Of course other nitro/acids can be used.

Hubs can also be formed by reacting the corresponding halo-hub (such a tribromobenzene) with aminophenol to form triamine compounds represented by the formula:

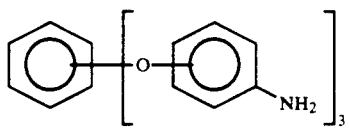

which can then be reacted with an acid anhydride to form a polycarboxylic acid of the formula:

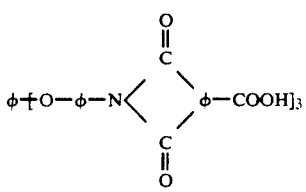

wherein φ=phenyl; the hub being characterized by an intermediate ether and imide linkage connecting aromatic groups. Thio-analogs are also contemplated, in accordance with U.S. Pat. No. 3,933,862.

The hub may also be a polyol such as those described in U.S. Pat. No. 4,709,008 to tris(hydroxyphenyl)alkanes of the general formula:

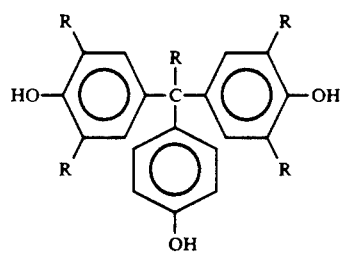

wherein R=hydrogen or methyl and can be the same or different. The polyols are made by reacting, for example, 4-hydroxybenzaldehyde or 4-hydroxyacetophenone with an excess of phenol under acid conditions (as disclosed in U.S. Pat. Nos. 4,709,008; 3,579,542; and 4,394,469).

The polyols may also be reacted with nitrophthalic anhydride, nitroaniline, nitrophenol, or nitrobenzoic acids to form other compounds suitable as hubs as will be understood by those of ordinary skill.

Phenoxyphenyl sulfone arms radiating from a hub with a terminal amine, carboxylic acid, or hydroxyl group are also precursors for making multidimensional polyester oligomers of the present invention.

The best results are likely to occur when the hub is phloroglucinol or cyuranic acid. In either case a suitable end-cap monomer (phenol or acid halide) can be reacted with the hub to form "short-armed," multidimensional oligomers having three or six crosslinking sites. These compounds are the simplest multidimensional oligomers and are relatively inexpensive to synthesize.

Multidimensional amides, amide imides, heterocycles, and heterocycle sulfones can be prepared using these carboxylic acid hubs, as will be understood by those of ordinary skill in the art.

Multidimensional oligomers of the formula:

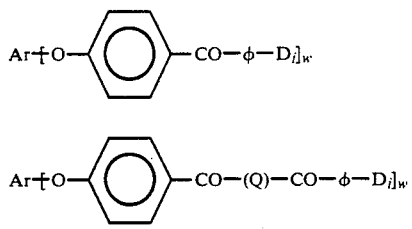

can also be synthesized with an Ullmann aromatic ether synthesis followed by a Friedel-Crafts reaction, as will be further explained.

Here, Q=

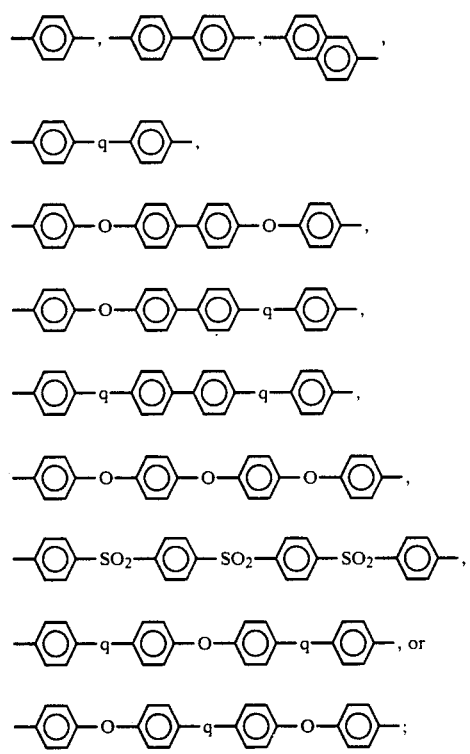

q=—SO—$_2$, —CO—, —S—, or —CF$_3$)$_2$C—, and preferably —SO$_2$—, or —CO—.

To form the Ar—[O—φ—CO—φ—D$_i$]$_w$ oligomers, preferably a halosubstituted hub is reacted with phenol in DMAC with a base (NaOH) over a Cu Ullmann catalyst to produce an ether "star" with active hydrogens para- to the ether linkages. End caps terminated with acid halide functionalities can react with these active aryl groups in a Friedel-Crafts reaction to yield the desired product. For example, 1 mole of trichlorobenzene can be reacted with about 3 moles of phenol in the Ullmann ether reaction to yield an intermediate of the general formula: φ—[O—φ]$_3$ which can, then, be reacted with about 3 moles of (Y)—COCl to produce the final, crosslinkable, ether/carbonyl oligomer.

Similarly, to form the Ar—[O—φ—CO—Q—CO—φ—D$_i$]$_w$ oligomers, the hub is extended preferably by reacting a halo-substituted hub with phenol in the Ullmann ether synthesis to yield the ether intermediate of the Ar—[O—φ—CO—φ—D$_i$]$_w$ compounds. This intermediate is mixed with the appropriate stoichiometric amounts of a diacid halide of the formula XOC—Q—COX and an end cap of the formula D$_i$—φ in the Friedel-Crafts reaction to yield the desired, chain-extended ether/carbonyl star and star-burst oligomers.

The end caps crosslink at different temperatures (i.e. their unsaturation is activated at different curing temperatures), so the cap should be selected to provide cured composites of the desired thermal stability. That is, the backbone of the oligomer should be stable to at least the cure temperature of the caps. The multidimensional morphology allows the oligomers to be cured at a temperature far below the use temperature of the resulting composite, so completely aromatic backbones connected by heteroatoms are preferred to enhance the thermal stability.

Blends can improve impact resistance of composites prepared from the coreactive oligomer blends without causing a significant loss of solvent resistance. The blends comprise mixtures of one or more crosslinkable oligomers and one or more polymers that are incapable of crosslinking, and generally comprise substantially equimolar amounts of one polymer and an oligomer having substantially identical backbones. The crosslinkable oligomer and comparable polymer can be blended together by mixing mutually soluble solutions of each. While the blend is preferably equimolar in the oligomer and polymer, the ratio of the oligomer and polymer can be adjusted to achieve the desired physical properties. Blends of this type are probably best suited to linear morphology, since multidimensional morphology presents the potential problem of formula weight mismatch in the cured composite.

The properties of the composite formed from the blend can be adjusted by altering the ratio of formula weights for the polymer and oligomer. The oligomer and polymer generally have substantially identical repeating units, but the oligomer and polymer merely be compatible in the solution prior to sweeping out as a prepreg. Of course, if the polymer and oligomer have identical backbones, compatibility in the blend is likely to occur.

Quenching compounds can be employed, if desired to regulate the polymerization of the comparable polymer, so that it has an average formula weight substantially identical with the crosslinkable oligomer. For thermal stability, an aromatic quenching compound, such as aniline, is preferred.

The noncrosslinking polymer can be made by the same synthetic method as the oligomer with the substitution of a quenching cap for the crosslinking end cap. For example, phenol can replace end caps of the formula A—OH; aniline can replace end caps of the formula A—NH$_2$; nitrobenzene can replace end caps of the formula A—NO$_2$; and benzoic acid chloride can replace end caps of the formula A—COX.

While the best blends are probably those in which the backbones are essentially identical and of modest formula weight and those in which the oligomer and polymer are in equimolar proportions, other compositions may be prepared, as will be recognized by those of ordinary skill in the art.

Solvent resistance may decrease markedly if the comparable polymer is provided in large excess to the crosslinkable oligomer in the blend.

The blends will generally comprise a mixture of one oligomer and a polymer of the same type, such as an amideimide oligomer and an amideimide polymer. The polymer may, however, be from another family, such as an imide or an amide. The mixture may include multiple oligomers or multiple polmers, such as a three component mixture of an amideimide oligomer, an amide oligomer, and an imide polymer. Etherimide oligomers or polymers may be suitable in such blends. A blend might include amideimides and etherimides with either or both resin including crosslinking end caps. Other combinations will be recognized by those of ordinary skill in the art.

The blends may yield semi-interpenetrating networks (semi-IPNs) of the general type described by Egli et al., "Semi-Interpenetrating Networks of LARC-TPI" available from NASA-Langley Research Center.

Generally the coreactive oligomer blends are selected to tailor the physical properties of the resulting block copolymer composites. For example, stiffening can be achieved for a composite made from ethersulfone oligomer by adding a benzoxazole oligomer as a coreactant in the blends of the present invention. Those skilled in the art will recognize the benefits to be gained through coreactive oligomer blends. Relatively stiff and rigid heterocycle oligomers can be toughened, for example, which is particularly important for the preparation of films.

Dopants for creating semiconductive or conductive composites with "Schiff base" oligomers are preferably selected from compounds commonly used to dope other polymers, namely, (1) dispersions of alkali metals (for high activity) or (2) strong chemical oxidizers, particularly alkali perchlorates (for lower activity). Arsenic compounds and elemental halogens, while active dopants, are too dangerous for general usage, and are not recommended.

The dopants react with the oligomers or polymers to form charge transfer complexes. N-type semiconductors result from doping with alkali metal dispersions. P-type semiconductors result from doping with elemental iodine or perchlorates. Dopant should be added to the oligomer or blend prior to forming the prepreg.

While research into conductive or semiconductive polymers has been active, the resulting compounds (mainly polyacetylenes, polyphenylenes, and polyvinylacetylenes) are unsatisfactory for aerospace applications because the polymers are:
(a) unstable in air;
(b) unstable at high temperatures;
(c) brittle after doping;
(d) toxic because of the dopants; or
(e) intractable.
These problems are overcome or significantly reduced with the conductive oligomers of the present invention.

As used in describing the suitable diacid halides and diamines, "Schiff base" is used throughout this specification in a generic way rather than in its typical chemical way, and is used to represent as well other conductive linkages, such as —CH=N—, oxazoles, thiazoles, or imidazoles. The heterocycle oligomers may simply need to be doped to exhibit semiconductive properties, and —CH=N— bonds may be unnecessary.

While conventional theory holds that semiconductive polymers should have (1) low ionization potentials, (2) long conjugation lengths, and (3) planar backbones, there is an inherent trade-off between conductivity and toughness or processibility, if these constraints are followed. To overcome the processing and toughness shortcomings common with Schiff base, oxazole, imidazole, or thiazole polymers, the oligomers of the present invention, include "sulfone" (i.e., electronegative) linkages interspersed along the backbone providing a mechanical swivel for the rigid, conductive segments of the arms. Phenoxyphenylsulfone or phenoxyphenylketone moieties are preferred to provide added toughness.

The coreactive oligomer blends of the present invention can be combined with reinforcing materials and cured to composite materials using heat or chemicals to activate crosslinking or interlinking between end caps. Prepregs can be prepared by conventional prepregging techniques. While woven fabrics are the typical reinforcement, the fibers can be continuous or discontinuous (in chopped or whisker form) and may be ceramic, organic, carbon (graphite), or glass, as suited for the desired application. Curing generally is conducted in conventional vacuum bagging techniques at elevated temperatures. The curing temperature varies with the choice of end cap. If desired, mixtures of end cap might be used.

The coreactive oligomer blends can also be used as varnishes, films, adhesives, and coatings.

As described with respect to polyimides, coreactants can be used with the oligomers or the coreactive oligomers blends. For ethers and ethersulfones, suitable coreactants include p-phenylenediamine; 4,4'-methylenedianiline; benzidine; lower alkyldiamines; or compounds of the general formulae:

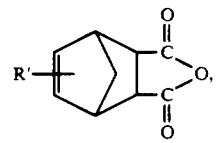

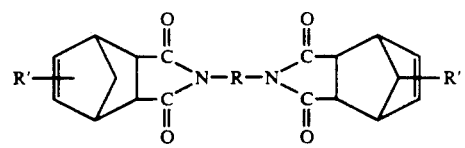

or

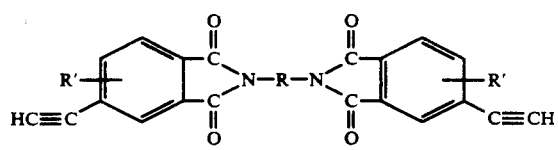

wherein
R' = hydrogen, lower alkyl, or aryl; and
R = lower alkyl (having about 2-6 carbon atoms) or aryl.

Coreactants of this same general type are also probably usable with the prepregging of the other oligomers, particularly the amideimides or etherimides.

HYPOTHETICAL EXAMPLES

1. Synthesis of Compound (a)

A diamine of the formula $H_2N-R_3-NH_3$ is reacted with two moles of an acid anhydride of the formula:

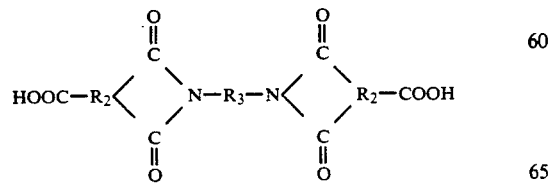

to form a dicarboxylic acid intermediate of the formula:

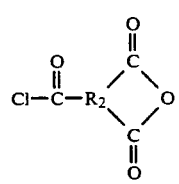

The intermediate is converted to the corresponding diacid chloride in the presence of $SOCl_2$, which is then condensed with one mole of a diamine of the formula $H_2N-R_4-NH_2$ and two moles of an amine end cap of the formula $Y_i-\phi-NH_2$ to yield the desired product.

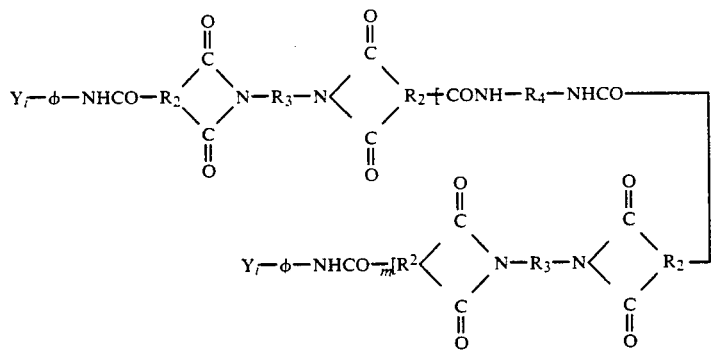

If excess diamine of the formula $H_2N-R_4-NH_2$ is used along with an acid halide end cap of the formula $Y_i-\phi-COX$, the product can have the formula:

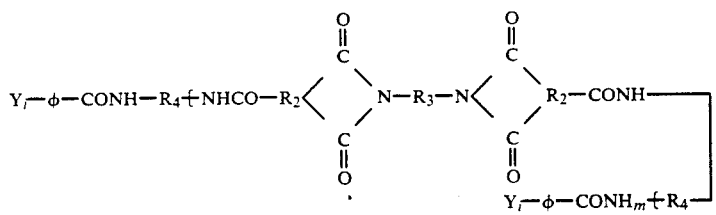

2. Synthesis of compound (b)

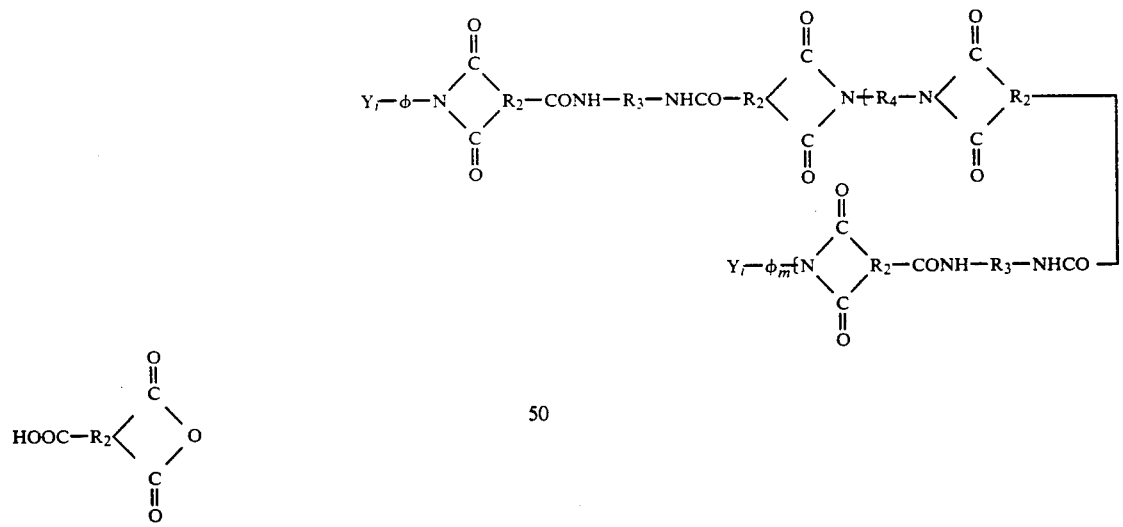

A diamine of the formula $H_2N-R_3-NH_2$ is reacted with $$Cl-\overset{\overset{O}{\|}}{C}-R_2\overset{\overset{\overset{O}{\|}}{C}}{\underset{\underset{\underset{O}{\|}}{C}}{\diagdown}}O$$

to yield a dianhydride intermediate of the formula:

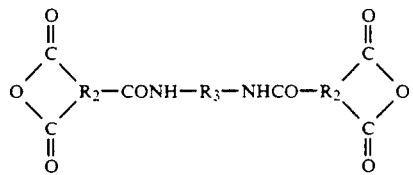

The intermediate is then condensed with $Y_i$—φ—$NH_2$ and a diamine of the formula $H_2N$—$R_4$—$NH_2$ to yield the desired product.

3. Synthesis of compound (d)

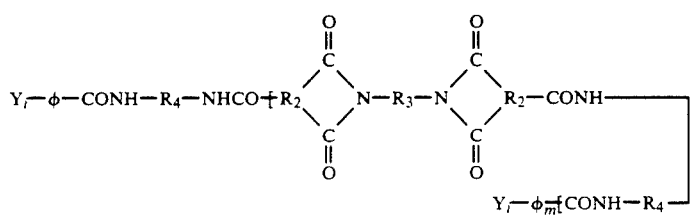

A diamine of the formula $H_2N$—$R_3$—$NH_2$ is reacted with an acid anhydride as in Example 1 to form a dicarboxylic acid intermediate that can be reacted with another diamine of the formula $H_2N$—$R_4$—$NH_2$ and an acid halide end cap of the formula $Y_i$—φ—COCl to yield the desired product.

4. Synthesis of compound (e)

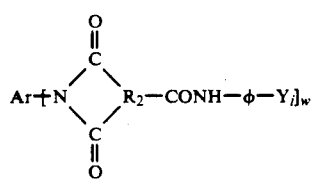

An aromatic hub like triaminobenzene is condensed with a phthalyl acid anhydride and an amine end cap to yield the desired product.

5. Synthesis of compound (f)

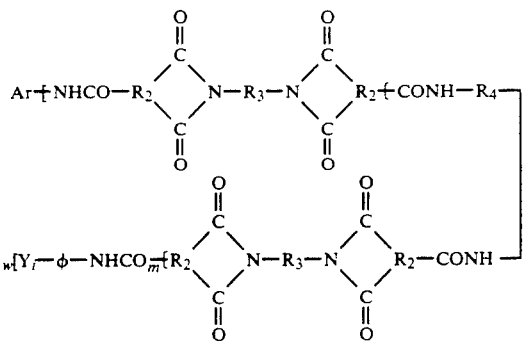

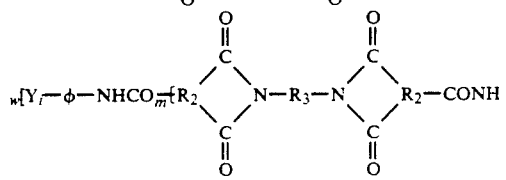

An amine-substituted hub like triaminobenzene, is reacted with the dicarboxylic acid intermediate of Example 1, a diamine of the formula $H_2N$—$R_4$—$NH_2$, and an amine end cap in the ratio of 1 mole of hub : (w)(m+1) moles of intermediate:(w)(m) moles of diamine:w moles of end cap to prepare the desired multidimensional product.

6. Synthesis of compound (g)

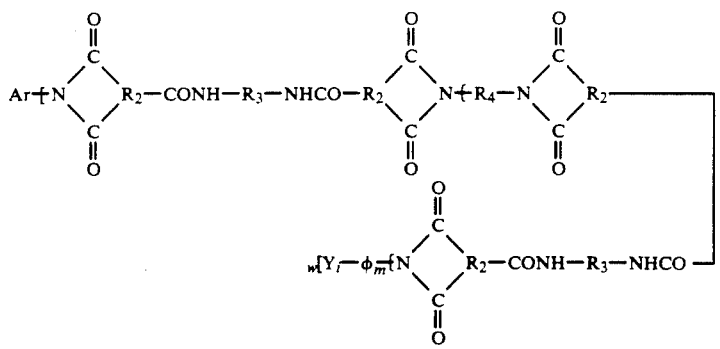

An aromatic amine hub is reacted with the dianhydride intermediate of Example 2, a diamine of the formula $H_2N$—$R_4$—$NH_2$, and an amine end cap on the ratio of 1 mole hub : (w)(m+1) moles dianhydride : (w)(m) moles diamine : w moles end cap to yield the desired product.

7. Synthesis of compound (h)

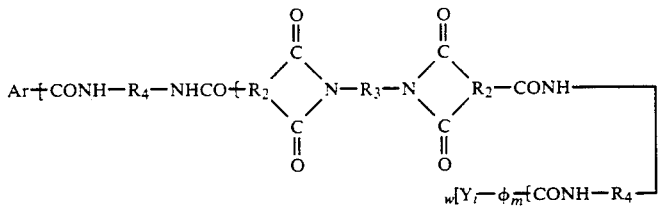

An aromatic acid or acid halide hub, like cyuranic acid, is reacted with a diamine of the formula $H_2N$—R-4—$NH_2$, a dicarboxylic acid intermediate of Example 1, and an acid halide end cap in the ratio of 1 mole hub: (w)(m+1) moles diamine : (w)(m) moles intermediate : w moles end cap to yield the desired product.

8. Synthesis of compound (i)

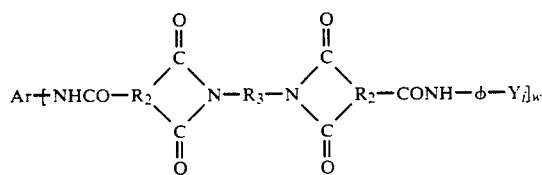

An aromatic amine hub is reacted with a dicarboxylic acid intermediate (or dihalide) of Example 1 and an amine end cap on the ratio of 1 mole hub : w moles intermediate : w moles cap to yield the desired product.

9. Synthesis of compound (j)

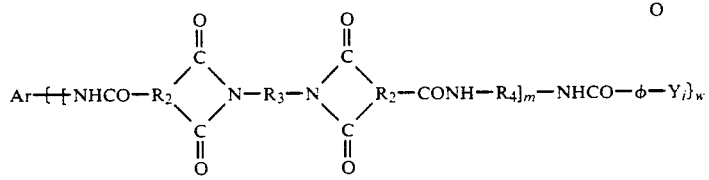

An aromatic amine hub is reacted with the intermediate of Example 8, a diamine, and an acid halide end cap in the ratio of 1 mole hub : w moles intermediate : w moles diamine, and w moles cap to form the desired product.

10. Synthesis of compound (k)

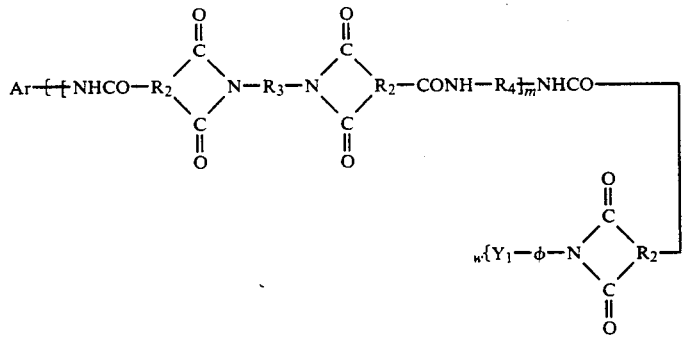

an aromatic amine hub is reacted with the intermediate of Example 1, a diamine of the formula $H_2N$—R-4—$NH_2$, and an acid or acid halide end cap of the formula:

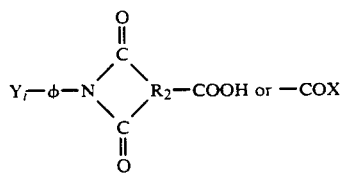

on the ratio of 1 mole hub : (w)(m) moles intermediate : (w)(m) moles diamine : w moles end cap to form the desired product.

The end cap is prepared by condensing an amine end cap of the formula: $Y_i$—φ—$NH_2$ with an acid anhydride of the formula:

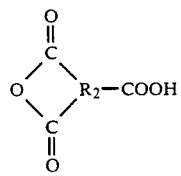

The acid halide is prepared from the acid in the presence of $SOCl_2$.

11. Synthesis of compound (l)

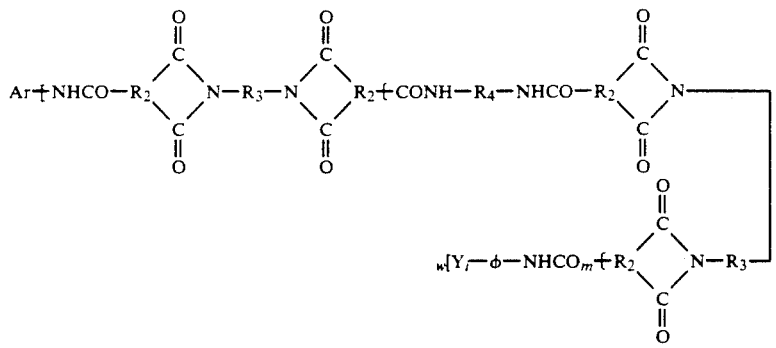

An aromatic amine hub is reacted with the dicarboxylic acid intermediate of Example 1, a diamine of the formula: $H_2N-R_3-NH_4$, and an amine end cap in the ratio of 1 mole hub : (w)(m+1) moles intermediate : (w)(m) moles diamine : w moles end cap to form the desired product.

12. Synthesis of compound (m)

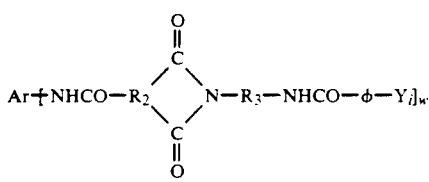

An aromatic amine hub is reacted with an acid halide anhydride of the formula:

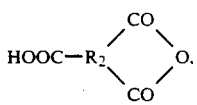

a diamine, and an acid halide end cap in the ratio of 1 mole hub : w moles acid halide anhydride : w moles diamine : w moles end cap to form the desired product. Preferably the reaction occurs in two steps with the reaction of occurs on two steps with the reaction of the hub and acid halide anhydride followed by the addition of the diamine and end cap.

13. Synthesis of compound (n)

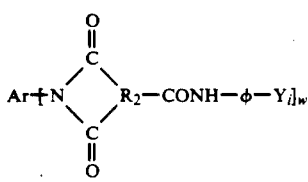

An aromatic amine hub is reacted with an acid anhydride of the formula:

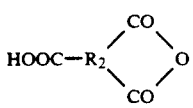

and an amine end cap on the ratio of 1 mole hub : w moles acid anhydride : w moles end cap to form the desired product.

14. Synthesis of compound (o)

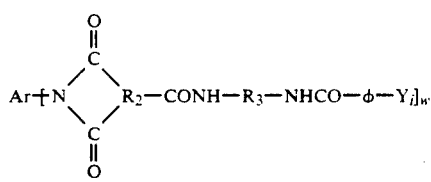

An aromatic amine hub is reacted with the acid anhydride of Example 13, a diamine of the formula $H_2N-R_3-NH_2$, and an acid halide end cap in the ratio of 1 mole hub : w moles acid anhydride : w moles diamine : w moles end cap to yield the desired product. Preferably the reaction occurs in two steps comprising the initial reaction between the hub and the acid anhydride with the subsequent simultaneous addition of the diamine and end cap.

15. Synthesis of compound (p)

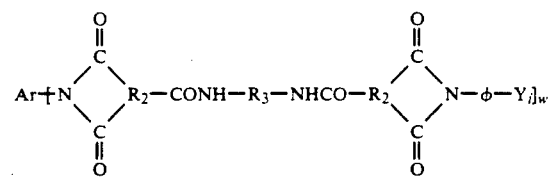

An aromatic amine hub is reacted with an acid anhydride of Example 13, a diamine of the formula $H_2N-R_3-NH_2$, and an amine end cap in the ratio of 1 mole hub: 2w moles acid anhydride: w moles diamine: w moles end cap to yield the desired product. Preferably the end cap and half of the acid anhydride are mixed to form an end cap conjugate of the formula:

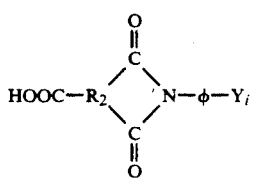

prior to mixing the reactants to form the oligomer. It also may be wise to mix the remaining acid anhydride with the hub to form an intermediate of the formula.

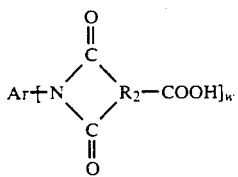

prior to adding the diamine and end cap conjugate.

Alternatively, the product can be made by reacting the hub with dianhydride intermediate of Example 2 and an amine end cap.

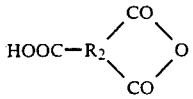

followed by reaction with an amine of the formula $H_2N-R_3-NH_2$, the intermediate of Example 1, and an amine end cap. Stepwise addition of the diamine to the extended hub followed by addition of the intermediate of Example 1 and amine end cap will reduce competitive side reactions.

17. Synthesis of compound (r)

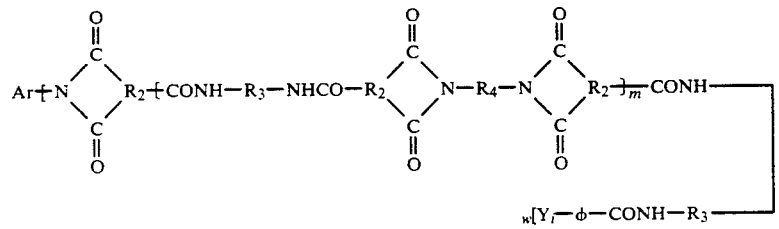

16. Synthesis of compound (q)

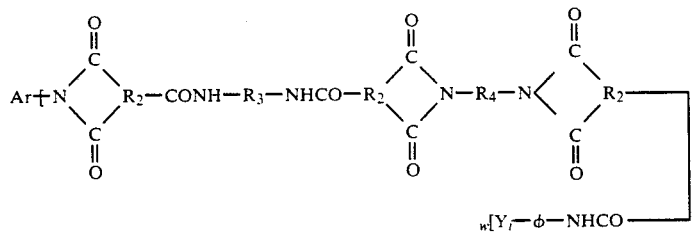

An aromatic amine hub is reacted with the intermediate of Example 2, a diamine of the formula: $H_2N-R_4-NH_2$, and an end cap conjugate formed by reacting an end cap amine with an acid halide anhydride of the formula:

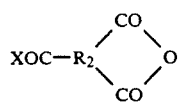

in the ratio of 1 mole hub: w moles intermediate: w moles end cap conjugate. The conjugate has the formula:

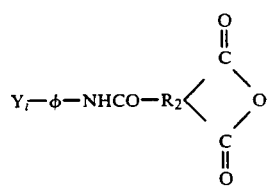

Alternatively, the product can be prepared by reacting the hub with an acid anhydride of the formula:

An aromatic amine hub is reacted with an acid anhydride of the formula:

HOOC—R$_2$⟨CO/CO⟩O to form an acid hub intermediate which is reacted with a diamine of the formula $H_2N-R_3-NH_2$, a dicarboxylic acid or acid halide intermediate of Example 1, and an acid or acid halide end cap in the ratio of 1 mole hub intermediate: (w)(m+1) moles diamine: (w)(m) moles dicarboxylic acid intermediate: w moles end cap to yield the desired product.

Alternatively, the product can be formed by reacting an amine hub with the dianhydride intermediate of Example 2, a diamine of the formula $H_2N-R_3-NH_2$, and acid anhydride of the formula:

HOOC—R$_2$⟨CO/CO⟩O, a second diamine of the formula $H_2N-R_3NH_2$, and an acid halide end cap in a stepwise reaction.

18. Synthesis of compound (s)

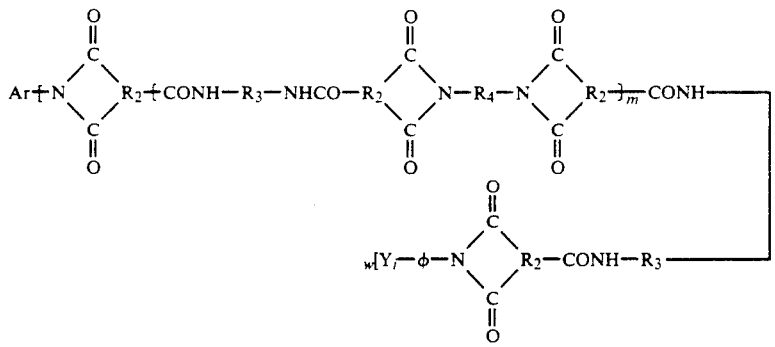

19. Synthesis of compound (t)

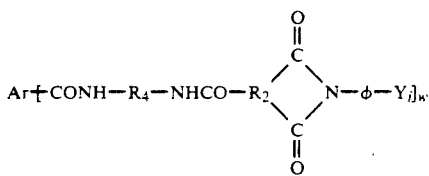

An aromatic acid hub is reacted with a diamine, an acid anhydride, and an amine end cap in the ratio of 1 mole hub: w moles diamine: w moles acid anhydride: w moles end cap to yield the desired product. Preferably the reaction includes the steps of reacting the acid anhydride with the end cap prior to addition of the hub and diamine.

An aromatic amine hub is reacted with the dianhydride intermediate of Example 2, a diamine of the formula H$_2$N—R$_3$—NH$_2$, and an amine end cap in the ratio of 1 mole hub: 2w moles intermediate: w moles diamine: w moles end cap to yield the desired product.

20. Synthesis of compound (u)

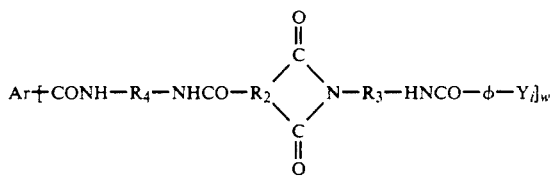

An aromatic acid hub is reacted with a diamine to form an amine extended hub conjugate that is reacted with an acid halide anhydride, another diamine, and an acid halide end cap to yield the desired product. Preparing an end cap conjugate by reacting the second diamine with the end cap prior to the addition of the other reactants reduces side or competitive reactions.

21. Synthesis of compound (v)

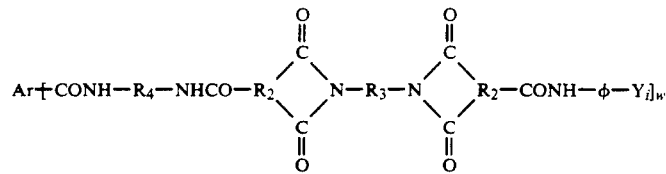

An aromatic acid hub is reacted with a daimine, the intermediate of Example 1, and an amine end cap in the ratio of 1 mole hub: w moles diamine: w moles intermediate: w moles end cap. Preferably, the reaction occurs in two stages with the hub being mixed with the diamine to form an amine conjugate to which the acid or acid halide intermediate and end cap is added simultaneously.

22. Synthesis of compound having a single diamine

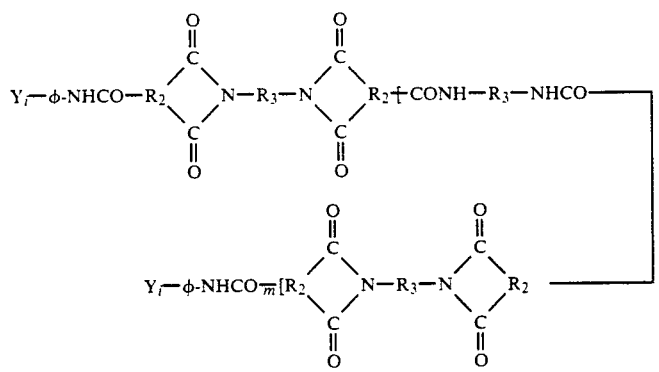

Two moles of an amine end cap are reacted with about (m+2) moles of an acid anhydride, such as phthalyl acid anhydride, and about (2m+1) moles of a diamine, such as $H_2N-\phi-SO_2-\phi-O-\phi-SO_2-\phi-NH_2$, to yield the desired product. To avoid side or competitive reactions, it is probably desirable to prepare a dicarboxylic acid intermediate of the formula:

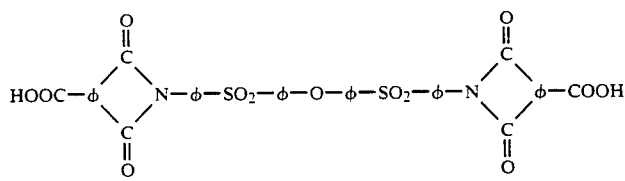

by mixing the acid anhydride and diamine in the ratio of about 2 moles acid anhydride : 1 mole diamine prior to adding the remaining reactants for simultaneous condensation to the oligomer.

Comparable oligomers to those described in Examples 2-21 can be prepared by using the same diamine $H_2N-R_3-NH_2$ in the condensation reaction to prepare the intermediate acids or anhydrides and in the oligomeric condensation. That is, in these oligomers, $R_3$ is the same as $R_4$.

23. Synthesis of multidimensional polyamide

The oligomer is prepared by reacting:

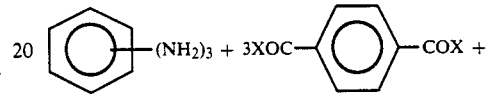

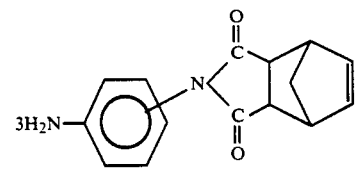

under an inert atmosphere to yield:

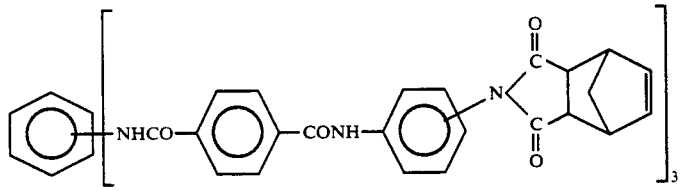

24. Synthesis of another polyamide

Another preferred multidimensional amide is prepared by

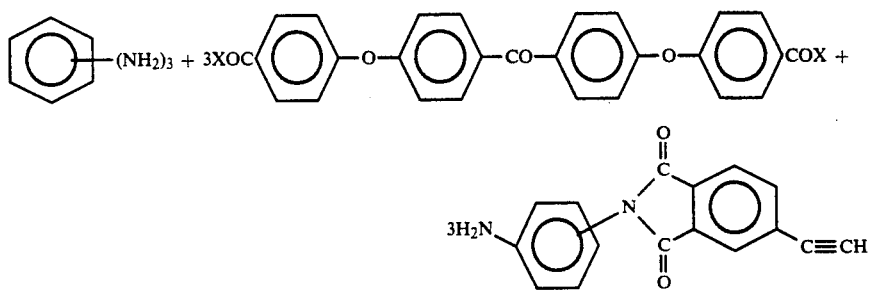

under an inert atmosphere to yield:

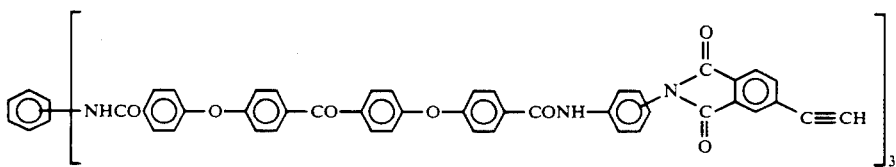

wherein
q=—SO$_2$—, —CO—, —S—, or —(CF$_3$)$_2$C—, and preferably —SO$_2$—, or —CO—

25. Synthesis of a difunctional, multidimensional polyamide

The oligomer is prepared by reacting:

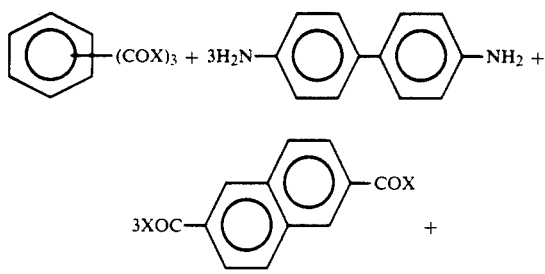

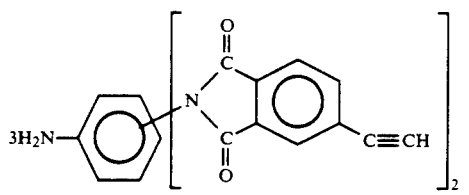

under an inert atmosphere to yield:

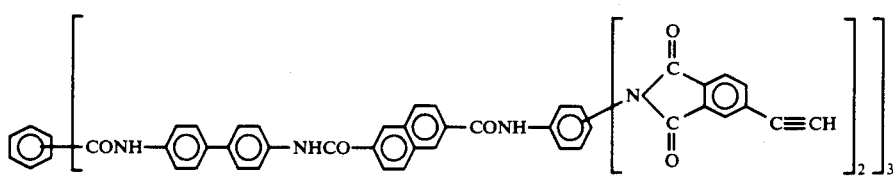

Competitive side reactions between the reactants in Example 25 will likely hinder the yield of this product and will make isolation of the product difficult. Yield can be enhanced by adding the reactants serially, but the physical properties of the resulting oligomers might be impaired.

26. Synthesis using an etheramine hub

Yet another multidimensional oligomer is prepared by reacting:

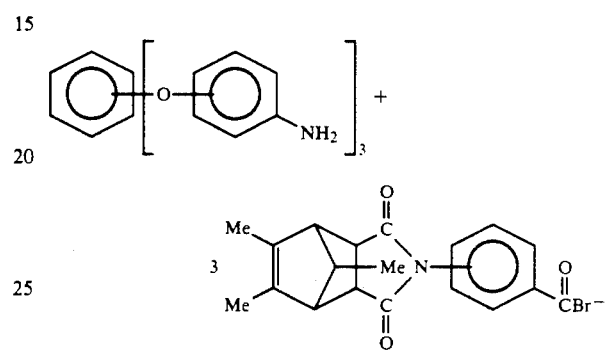

under an inert atmosphere to yield:

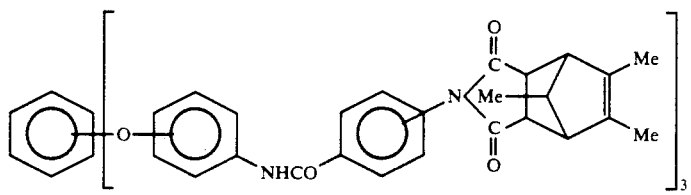

27. Synthesis of a multidimensional polyamide using anhydride end cap

The oligomer is prepared by reacting:

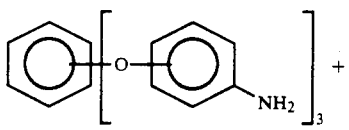

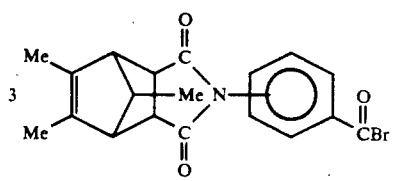

under an inert atmosphere to yield:

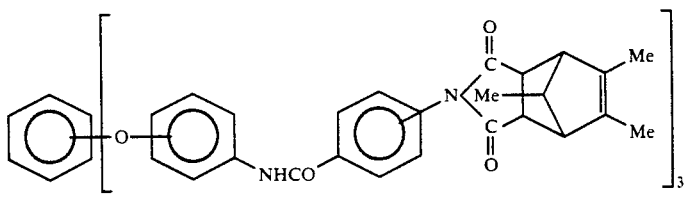

28. Synthesis using melamine as a hub

The oligomer is prepared by reacting melamine with nadic anhydride to yield:

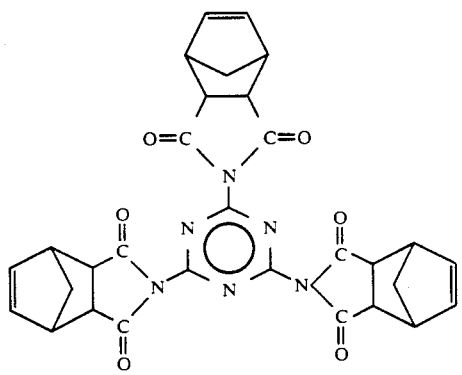

29. Synthesis of a polyamide having an acid halide hub, a diamine arms, and anhydride end caps The oligomer is prepared by reacting about 1 mole of

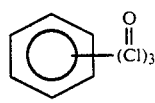

with about 3 moles of phenylenediamine and about 3 moles of

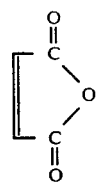

to yield primarily:

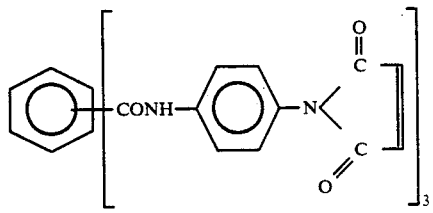

Better yield might be obtained by reacting the anhydride with aminobenzoic acid and converting the —COOH functionality to an amine followed by condensation of the monofunctional amine cap with the acid halide hub.

30. Preparation of an advanced composite blend

The polyamideimide oligomer of Example 1, wherein $R_2 = R_3 = R_4 =$ phenyl, $m = 1$, $i = 2$, and $Y =$

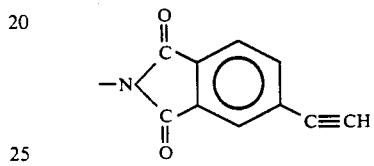

is dissolved in a suitable solvent.

A relative high average formula weight polyether polymer is made by condensing a dialcohol of the general formula:

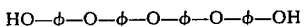

HO—φ—O—φ—O—φ—O—φ—OH with Cl—φ—Cl and phenol (to quench the polymerization) under an inert atmosphere in the same solvent as used with the polyamideimide or another solvent miscible with that of the polyamideimide.

The two solutions are mixed to form the advanced composite blend, which can be prepregged or dried prior to curing to an advanced amideimide/ether composite. In the present invention, the advanced composite blend, however, would normally be mixed with a $Z_k$—B—$Z_k$ oligomer to form a coreactive oligomer blend, which would, then, be prepregged and cured.

31. Preparation of a multidimensional advanced composite blend

A multidimensional, polyether sulfone polymer is prepared by reacting phloroglucinol with Cl—φ—Cl and a dialcohol of the general formula: HO—φ—O—φ—SO$_2$—φ—O—φ—OH. The polymerization is quenched with either φ—Cl or phenol. The condensation occurs in a suitable solvent under an inert atmosphere. The product is not recovered from the solvent.

A multidimensional, polyamide oligomer is prepared in the same solvent as used for the polymer or in another miscible solvent by condensing cyuranic acid chloride with

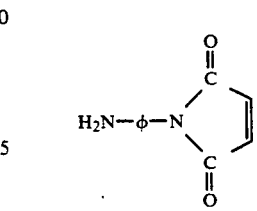
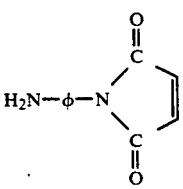

The oligomer product is not recovered, but the reaction mixture is mixed with the polymer product and a phenoxyphenyl sulfone diamine to form a multidimensional advanced composite blend of coreactive oligomers that can be prepregged or dried prior to curing to form a multidimensional, polyamide/polyethersulfone, advanced composite.

While para isomerization is shown, other isomers are possible. Furthermore, the aryl groups can have substituents, if desired, such as halogen, lower alkyl up to about 4 carbon atoms, lower alkoxy up to about 4 carbon atoms, or aryl. Substituents may create steric hindrance problems in synthesizing the oligomers or in crosslinking the oligomers into the final composites.

While preferred embodiments have been described, those skilled in the art will readily recognize alterations, variations, or modifications which might be made to the embodiments without departing from the inventive concept. Therefore, the claims should be interpreted liberally with the support of the full range of equivalents known to those of ordinary skill based upon this description. The claims should be limited only as is necessary in view of the pertinent prior art.

We claim:

1. A coreactive oligomer blend comprising a mixture of a first oligomer of the formula:

wherein
i is 1 or 2;
A is a hydrocarbon backbone;
D is an unsaturated hydrocarbon residue including a segment selected from the group consisting of:

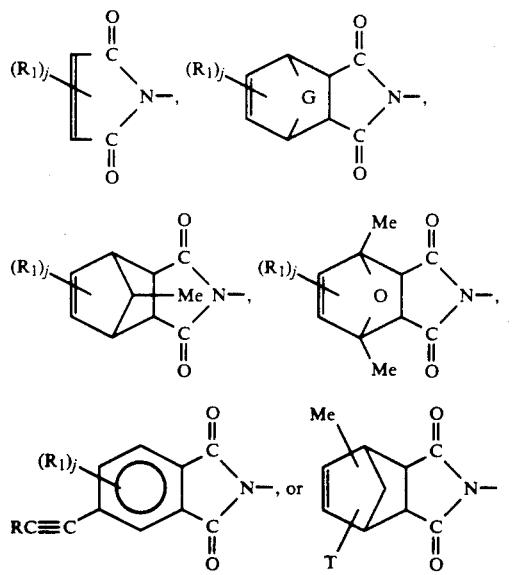

R is hydrogen, lower alkyl, or phenyl;
j is 0, 1, or 2;
Me is methyl;
T is allyl or methallyl;
G is —SO$_2$—, —S—, —O—, —CH$_2$—, —CHR—, —CR$_2$—, or —CO—; and
R$_1$ is hydrogen, lower alkyl or phenyl, a second oligomer of the formula:

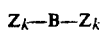

wherein
k is 1 or 2;
B is a hydrocarbon backbone;
Z is a hydrocarbon residue including a segment selected from the group consisting of

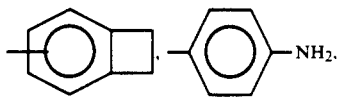

or

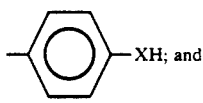

X is —O— or —S—, and
a noncrosslinking polymer having a backbone that is compatible with both A and B.

2. A composite comprising a cured blend of claim 1.

3. A prepreg comprising the blend of claim 1 and a reinforcing additive in fiber or particulate form.

4. A composite comprising the cured prepreg of claim 3.

5. A coreactive oligomer blend comprising a mixture of a first oligomer of the formula:

wherein
i is 1 or 2;
A is a hydrocarbon backbone having an average molecular weight of at least about 10,000;
D is an unsaturated hydrocarbon residue including a segment selected from the group consisting of:

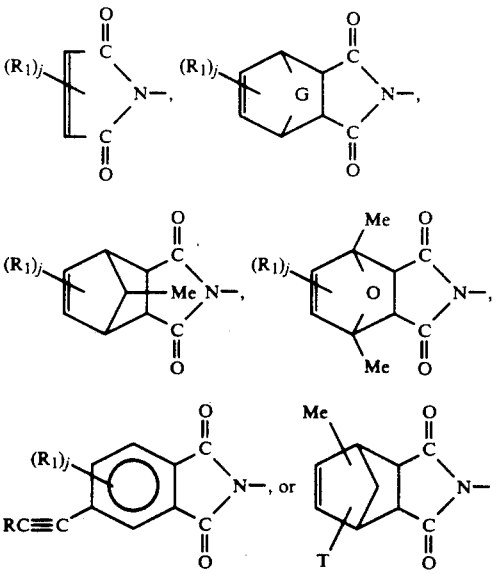

R is hydrogen, lower alkyl, or phenyl;
j is 1, 1, or 2;
Me is methyl;
T is allyl or methallyl;
G is —SO$_2$—, —S—, —O—, —CH$_2$—, —CHR—, —CR$_2$—, or —CO—; and $R_1$ is hydrogen, lower alkyl or phenyl, a second oligomer of the formula:

$$Z_k—B—Z_k$$

wherein
k is 1 or 2;
B is a hydrocarbon backbone;
Z is a hydrocarbon residue including a segment selected from the group consisting of

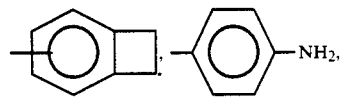

or

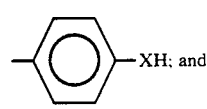

X is —O— or —S—, and
a noncrosslinking polymer having a backbone that is compatible with both A and B.

6. A method for forming a coreactive oligomer blend comprising the steps of mixing a first oligomer of the formula:

$$D_i—A—D_i$$

wherein
i is 1 or 2;
A is a hydrocarbon backbone;
D is an unsaturated hydrocarbon residue including a segment selected from the group consisting of:

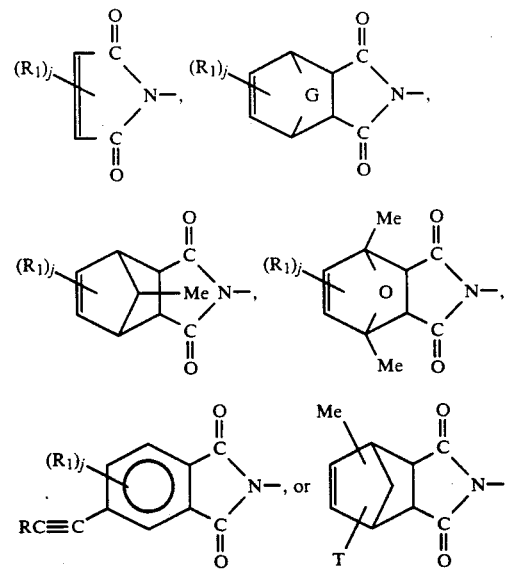

R is hydrogen, lower alkyl, or phenyl;
j is 0, 1, or 2;
Me is methyl;
T is allyl or methallyl;
G is —SO₂—, —S—, —O—, —CH₂—, —CHR—, —CR₂—, or —CO—; and $R_1$ is hydrogen, lower alkyl or phenyl, and a second oligomer of the formula:

$$Z_k—B—Z_k$$

wherein
k is 1 or 2;
B is a hydrocarbon backbone;
Z is a hydrocarbon residue including a segment selected from the group consisting of

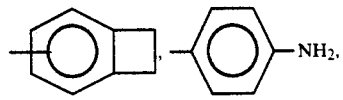

or

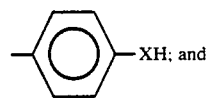

X is —O— or —S—,
with a noncrosslinking polymer having a backbone that is compatible with both A and B.

7. The method of claim 6 wherein the second oligomer has the formula Z—B—Z and Z=—NH₂, —OH, or —SH.

8. A method for forming a coreactive oligomer blend comprising the steps of mixing a first oligomer of the formula:

$$D_i—A—D_i$$

wherein
i is 1 or 2;
A is a hydrocarbon backbone having an average molecular weight of at least about 10,000;
D is an unsaturated hydrocarbon residue including a segment selected from the group consisting of:

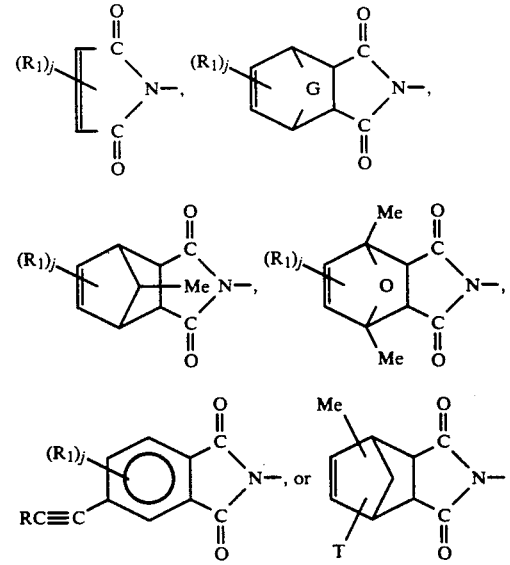

R is hydrogen, lower alkyl, or phenyl;
j is 0, 1 or 2;
Me is methyl;

T is allyl or methallyl;

G is —SO$_2$—, —S—, —O—, —CH$_2$—, —CHR—, —CR$_2$—, or —CO—; and

R$_1$ is hydrogen, lower alkyl or phenyl, and a second oligomer of the formula:

$$Z_k—B—Z_k$$

wherein k is 1 or 2;

B is a hydrocarbon backbone;

z is a hydrocarbon residue including a segment selected from the group consisting of

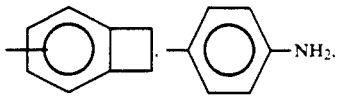

or

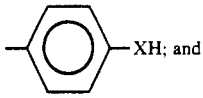

X is —O— or —S—, with a noncrosslinking polymer having a backbone that is compatible with both A and B.

* * * * *

UNITED STATES PATENT AND TRADEMARK OFFICE
CERTIFICATE OF CORRECTION

PATENT NO. : 5,159,055
DATED : October 27, 1992
INVENTOR(S) : Clyde H. Sheppard and Hyman R. Lubowitz It is certified that error appears in the above-identified patent and that said Letters Patent is hereby corrected as shown below:

In column 11, line 1, formula (a) should read

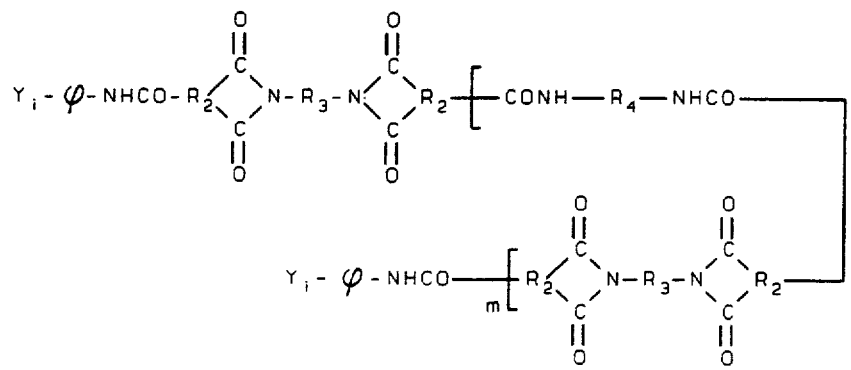

In column 11, line 48, formula (d) should read

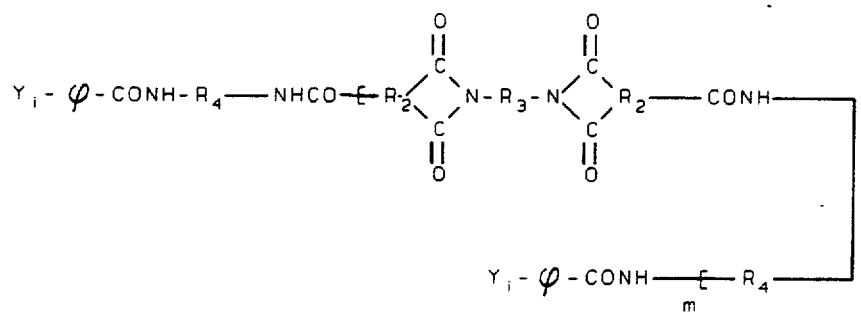

UNITED STATES PATENT AND TRADEMARK OFFICE
CERTIFICATE OF CORRECTION

PATENT NO. : 5,159,055
DATED : October 27, 1992
INVENTOR(S) : Clyde H. Sheppard and Hyman R. Lubowitz It is certified that error appears in the above-identified patent and that said Letters Patent is hereby corrected as shown below:

In column 35, line 28, formula (f) should read

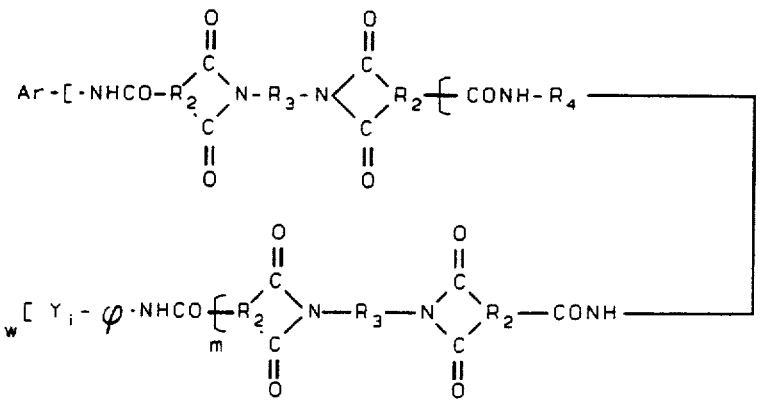

Signed and Sealed this

Eighteenth Day of February, 1997

Attest:

BRUCE LEHMAN

Attesting Officer     Commissioner of Patents and Trademarks